United States Patent
Kunita et al.

(10) Patent No.: US 11,545,689 B2
(45) Date of Patent: Jan. 3, 2023

(54) ELECTROLYTE MEMBRANE

(71) Applicant: Toray Industries, Inc., Tokyo (JP)

(72) Inventors: Tomoyuki Kunita, Otsu (JP); Hiroaki Umeda, Otsu (JP); Tatsuhiro Inoue, Otsu (JP)

(73) Assignee: TORAY INDUSTRIES, INC., Tokyo (JP)

( * ) Notice: Subject to any disclaimer, the term of this patent is extended or adjusted under 35 U.S.C. 154(b) by 35 days.

(21) Appl. No.: 16/975,205

(22) PCT Filed: Mar. 19, 2019

(86) PCT No.: PCT/JP2019/011393
§ 371 (c)(1),
(2) Date: Aug. 24, 2020

(87) PCT Pub. No.: WO2019/188572
PCT Pub. Date: Oct. 3, 2019

(65) Prior Publication Data
US 2021/0005912 A1 Jan. 7, 2021

(30) Foreign Application Priority Data
Mar. 30, 2018 (JP) .............................. JP2018-067925

(51) Int. Cl.
| H01M 8/1004 | (2016.01) |
| H01M 8/106 | (2016.01) |
| H01M 8/103 | (2016.01) |
| H01M 8/1032 | (2016.01) |
| H01M 8/1027 | (2016.01) |
| H01M 8/1034 | (2016.01) |
| H01M 8/1041 | (2016.01) |
| H01M 8/1088 | (2016.01) |
| H01M 8/1039 | (2016.01) |
| H01M 8/1048 | (2016.01) |

(52) U.S. Cl.
CPC ......... *H01M 8/1088* (2013.01); *H01M 8/103* (2013.01); *H01M 8/1004* (2013.01); *H01M 8/106* (2013.01); *H01M 8/1027* (2013.01); *H01M 8/1032* (2013.01); *H01M 8/1034* (2013.01); *H01M 8/1039* (2013.01); *H01M 8/1041* (2013.01); *H01M 8/1048* (2013.01)

(58) Field of Classification Search
None
See application file for complete search history.

(56) References Cited

U.S. PATENT DOCUMENTS

| 5,998,057 | A | * | 12/1999 | Koschany | ............... | H01M 4/86 |
| | | | | | | 429/475 |
| 2017/0198161 | A1 | * | 7/2017 | Kato | ...................... | C09D 5/022 |
| 2021/0005912 | A1 | | 1/2021 | Kunita et al. | | |

FOREIGN PATENT DOCUMENTS

| EP | 3065209 A1 | | 9/2016 | | |
| EP | 3270449 B1 | * | 2/2021 | ............. | B01D 71/06 |
| JP | 2004146367 A | | 5/2004 | | |
| JP | 2004253336 A | | 9/2004 | | |
| JP | 2004335119 A | | 11/2004 | | |
| JP | 2005168401 A | | 6/2005 | | |
| JP | 2007280653 A | | 10/2007 | | |
| JP | 2008140608 A | * | 6/2008 | | |
| JP | 2009218154 A | | 9/2009 | | |
| JP | 2010182538 A | * | 8/2010 | | |
| JP | 2010182538 A | | 8/2010 | | |
| WO | WO 2010/005267 | * | 1/2010 | | |
| WO | 2019188572 A1 | | 10/2019 | | |

OTHER PUBLICATIONS

International Search Report and Written Opinion for International Application No. PCT/JP2019/011393 dated May 21, 2019, 7 pages.
Supplementary European Search Report for European Application No. 19777775.8, dated Dec. 13, 2021, 7 pages.

* cited by examiner

*Primary Examiner* — Basia A Ridley
*Assistant Examiner* — Heng M. Chan
(74) *Attorney, Agent, or Firm* — RatnerPrestia

(57) ABSTRACT

An electrolyte membrane is described that has improved bondability with a catalyst layer and that achieves good power generation performance, without the electrolyte membrane undergoing a physical treatment and without any loss of surface modification effect, where the electrolyte membrane comprises a polymer electrolyte and a nonionic fluorochemical surfactant.

15 Claims, No Drawings

ELECTROLYTE MEMBRANE

CROSS REFERENCE TO RELATED APPLICATIONS

This is the U.S. National Phase application of PCT/JP2019/011393, filed Mar. 19, 2019 which claims priority to Japanese Patent Application No. 2018-067925, filed Mar. 30, 2018, the disclosures of these applications being incorporated herein by reference in their entireties for all purposes.

FIELD OF THE INVENTION

The present invention relates to an electrolyte membrane used in a polymer electrolyte fuel cell and the like.

BACKGROUND OF THE INVENTION

Fuel cells are a kind of power generator from which electric energy is extracted by electrochemical oxidation of a fuel such as hydrogen or methanol, and have recently attracted attention as a clean energy source. Above all, polymer electrolyte fuel cells have a low standard operating temperature of around 100° C. and a high energy density. Therefore, polymer electrolyte fuel cells are expected to be widely applied to relatively small distributed power generation facilities as well as to power generators for mobile objects such as automobiles and ships. Polymer electrolyte fuel cells have also attracted attention as a power source for small mobile devices and portable devices, and are expected to be installed in mobile phones, personal computers, and the like in place of secondary batteries such as nickel-hydrogen batteries and lithium-ion batteries.

A fuel cell usually includes, as a unit, a cell including a membrane electrode assembly (MEA) sandwiched between separators. In the MEA, a catalyst layer is arranged on either side of an electrolyte membrane, and a gas diffusion layer is further arranged on either side of the resulting laminate. In the MEA, the catalyst layer and the gas diffusion layer that are arranged on either side of the electrolyte membrane form a pair of electrode layers, and one of the electrode layers is an anode electrode and the other is a cathode electrode. A fuel gas containing hydrogen comes into contact with the anode electrode, and the air comes into contact with the cathode electrode, whereby electric power is generated by an electrochemical reaction. The electrolyte membrane is mainly made from a polymer electrolyte material. The polymer electrolyte material is also used as a binder for the catalyst layer.

Conventionally, Nafion® (manufactured by E. I. du Pont de Nemours and Company), which is a fluoropolymer electrolyte, has been widely used as a polymer electrolyte material. Nafion® exhibits high proton conductivity under low humidification through a proton conduction channel formed by a cluster structure. Meanwhile, Nafion® has problems that it is very expensive because of being produced through multi-step synthesis, and that the above-mentioned cluster structure causes significant fuel crossover. Further, fuel cells are repeatedly subjected to the dry-wet cycle under the operating conditions, and in particular, the electrolyte membrane repeatedly swells and shrinks. In such a process, since the electrolyte membrane is bound by the separators and the like, the electrolyte membrane may be wrinkled or slackened, or broken due to local stress concentration, and may lose the mechanical strength or physical durability. Further, it has been pointed out that Nafion® cannot be used at high temperature because of the low softening point. Moreover, problems such as disposal after use and the difficulty of material recycling have also been pointed out. In order to overcome such problems, an inexpensive hydrocarbon-based electrolyte membrane that can be used in place of Nafion® and that is excellent in membrane characteristics has been actively developed in recent years.

Meanwhile, in order to improve the power generation performance of the fuel cell, it is important that the catalyst layer and the electrolyte membrane have high bondability at the interface therebetween. Conventionally, due to the insufficient bondability at the interface between the catalyst layer and the electrolyte membrane, there has been a problem that the interface may have increased resistance to deteriorate the power generation performance. Therefore, in order to improve the bondability between the catalyst layer and the electrolyte membrane, there have been proposed a method of modifying a surface of the electrolyte membrane, a method of increasing the contact area of the electrolyte membrane with the catalyst layer, and a method of directly applying the catalyst layer to the electrolyte membrane.

Patent Document 1 discloses a method of modifying a surface of an electrolyte membrane by plasma or corona discharge treatment. Patent Document 2 discloses a method of increasing the contact area between an electrolyte membrane and a catalyst layer by forming an uneven structure on a surface of the electrolyte membrane. Patent Document 3 discloses a method of directly applying a catalyst layer to an electrolyte membrane.

PRIOR ART DOCUMENTS

Patent Documents

Patent Document 1: Japanese Patent Laid-open Publication No. 2009-218154
Patent Document 2: Japanese Patent Laid-open Publication No. 2005-166401
Patent Document 3: Japanese Patent Laid-open Publication No. 2004-146367

SUMMARY OF THE INVENTION

Patent Document 1, however, has a problem that the effect of the plasma or corona discharge treatment is limited in life, and the effect of modification may be deactivated. Further, Patent Document 2 has a problem that the electrolyte membrane is likely to be broken starting from the recesses that are provided in the surface of the membrane and where the membrane is thin, and the membrane may have lower durability. Patent Document 3 has a problem that, upon application of the catalyst layer to the electrolyte membrane, the electrolyte membrane may absorb the solvent contained in the catalyst layer to swell, so that the electrolyte membrane may be wrinkled or slackened to have lower durability.

In view of the above-mentioned background, an object of the present invention is to provide an electrolyte membrane that is improved in the bondability to the catalyst layer without being physically treated and without being deactivated in the effect of surface modification, and that realizes good power generation performance.

The electrolyte membrane of the present invention for solving the above-mentioned problems contains a polymer electrolyte and a nonionic fluorosurfactant.

The electrolyte membrane of the present invention can be improved in the bondability to the catalyst layer, and can realize good power generation performance.

DETAILED DESCRIPTION OF EMBODIMENTS OF THE INVENTION

In the following, the present invention will be described in detail. Hereinafter, the wording "to" in a numerical range represents that the range includes numerical values at both ends thereof.

<Electrolyte Membrane>

[Polymer Electrolyte]

The polymer electrolyte used in the present invention is a polymer having proton conductivity owing to an ionic group contained therein, and may be either a fluoropolymer electrolyte or a hydrocarbon polymer.

Herein, the "fluoropolymer electrolyte" means an electrolyte in which most or all of hydrogen atoms of an alkyl group and/or an alkylene group in the polymer are substituted with fluorine atoms. Typical examples of the fluoropolymer electrolyte having an ionic group include commercially available products such as Nafion® (manufactured by E. I. du Pont de Nemours and Company), FLEMION® (manufactured by Asahi Glass Co., Ltd.), and Aciplex® (manufactured by Asahi Kasei Corporation).

These fluoropolymer electrolytes are very expensive, and have a problem of significant gas crossover. Therefore, the polymer electrolyte used in the present invention is preferably a hydrocarbon polymer also from the viewpoint of mechanical strength, physical durability, chemical stability and the like. Specifically, in the present invention, the polymer electrolyte is preferably an ionic group-containing hydrocarbon polymer. The aspect in which the polymer electrolyte is a hydrocarbon polymer is particularly preferable also in that a great effect of the present invention, that is, the effect of improving the bondability to the catalyst layer is exerted. Further, an aspect in which the polymer electrolyte is a hydrocarbon polymer and the catalyst layer contains a fluoropolymer electrolyte as will be described later is more preferable because the bondability of the polymer electrolyte to the catalyst layer is greatly improved, and a great effect of improving the power generation performance is exerted.

The hydrocarbon polymer is preferably an aromatic hydrocarbon polymer having an aromatic ring in the main chain. Herein, the aromatic ring may include not only a hydrocarbon aromatic ring but also a hetero ring. In addition, the hydrocarbon polymer may be partially formed from an aliphatic unit together with the aromatic ring unit.

Specific examples of the aromatic hydrocarbon polymer include polymers having, in the main chain, a structure selected from polysulfone, polyether sulfone, polyphenylene oxide, a polyarylene ether polymer, polyphenylene sulfide, polyphenylene sulfide sulfone, polyparaphenylene, a polyarylene polymer, polyarylene ketone, polyether ketone, polyarylene phosphine oxide, polyether phosphine oxide, polybenzoxazole, polybenzothiazole, polybenzimidazole, polyamide, polyimide, polyetherimide, and polyimidesulfone together with an aromatic ring. Note that "polysulfone", "polyether sulfone", "polyether ketone", and the like referred to herein are generic terms for structures having a sulfone bond, an ether bond, or a ketone bond in their molecular chains, and encompass polyether ketone ketone, polyether ether ketone, polyether ether ketone ketone, polyether ketone ether ketone ketone, and polyether ketone sulfone. The hydrocarbon skeleton may have a plurality of structures among the above-mentioned structures. Above all, a polymer having a polyether ketone skeleton, that is, a polyether ketone polymer is most preferable for the aromatic hydrocarbon polymer.

The polymer electrolyte is suitably an electrolyte that forms a co-continuous or lamellar phase-separated structure. Such a phase-separated structure may be exhibited, for example, in a molded product containing a polymer blend of two or more incompatible polymers, such as an ionic group-containing hydrophilic polymer and an ionic group-free hydrophobic polymer, or a block copolymer including two or more incompatible segments, such as an ionic group-containing segment (A1) and an ionic group-free segment (A2). In a co-continuous or lamellar phase-separated structure, both hydrophilic and hydrophobic domains form a continuous phase, so that continuous proton conduction channels are formed, and a polymer electrolyte molded product excellent in proton conductivity is likely to be obtained. Herein, the "domain" means a mass formed by aggregation of similar substances or segments in one molded product.

The polymer electrolyte is particularly preferably a block copolymer having at least one ionic group-containing segment (A1) and at least one ionic group-free segment (A2). Herein, the "segment" means a partial structure that is present in a polymer chain of a copolymer and includes repeating units exhibiting specific properties, and has a molecular weight of 2,000 or more. Use of a block copolymer makes it possible to exhibit a co-continuous phase-separated structure having finer domains than in the case of a polymer blend, and to achieve more excellent power generation performance and physical durability.

Hereinafter, the ionic group-containing segment (A1) or polymer may be referred to as an "ionic block", and the ionic group-free segment (A2) or polymer may be referred to as a "nonionic block". However, the phrase "ionic group-free" herein does not exclude an aspect in which the segment or polymer contains a small amount of ionic groups to the extent that the formation of the phase-separated structure is not inhibited.

In such a block copolymer, the molar composition ratio of the ionic block to the nonionic block (A1/A2) is preferably 0.20 or more, more preferably 0.33 or more, still more preferably 0.50 or more. Further, the molar composition ratio (A1/A2) is preferably 5.00 or less, more preferably 3.00 or less, still more preferably 2.50 or less. If the molar composition ratio (A1/A2) is less than 0.20 or more than 5.00, proton conductivity under low humidification conditions may be insufficient, or hot water resistance or physical durability may be insufficient. Herein, the molar composition ratio (A1/A2) represents the ratio of the number of moles of repeating units present in the ionic block to the number of moles of repeating units present in the nonionic block. The "number of moles of repeating units" is a value obtained by dividing the number average molecular weight of the ionic block or the nonionic block by the molecular weight of the corresponding constituent unit.

The ionic group contained in the polymer electrolyte may be any ionic group having a proton exchange ability. Such a functional group is preferably a sulfonic acid group, a sulfonimide group, a sulfuric acid group, a phosphoric acid group, a phosphoric acid group, or a carboxylic acid group. The polymer may contain two or more types of ionic groups. Above all, it is more preferable that the polymer have at least one group selected from a sulfonic acid group, a sulfonimide group, and a sulfuric acid group from the viewpoint of high proton conductivity, and it is most preferable that the polymer have a sulfonic acid group from the viewpoint of raw material cost.

The polymer electrolyte preferably has an ion exchange capacity (IEC) of 0.1 meq/g or more and 5.0 meq/g or less in view of the balance between proton conductivity and water resistance. The IEC is more preferably 1.4 meq/g or more, still more preferably 2.0 meq/g or more. Meanwhile, the IEC is more preferably 3.5 meq/g or less, still more preferably 3.0 meq/g or less. If the IEC is less than 0.1 meq/g, proton conductivity may be insufficient, and if the IEC is more than 5.0 meq/g, water resistance may be insufficient.

Herein, the "IEC" refers to the molar amount of ionic groups introduced per unit dry weight of the polymer electrolyte. The larger the value of the IEC is, the larger the introduction amount of ionic groups is. In the present invention, the IEC is defined as a value obtained by the neutralization titration method. The IEC is calculated by the neutralization titration according to the method described in item (2) in the section of EXAMPLES.

In the present invention, it is particularly preferable to use an aromatic hydrocarbon block copolymer as the polymer electrolyte, and the aromatic hydrocarbon block copolymer is more preferably a polyether ketone block copolymer. In particular, it is particularly preferable to use a polyether ketone block copolymer including a segment containing an ionic group-containing constituent unit (S1) and a segment containing an ionic group-free constituent unit (S2) shown below.

[Chemical Formula 1]

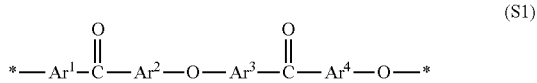

(S1)

In the general formula (S1), $Ar^1$ to $Ar^4$ each represent any divalent arylene group, $Ar^1$ and/or $Ar^2$ contains an ionic group, and $Ar^3$ and $Ar^4$ may or may not contain an ionic group. $Ar^1$ to $Ar^4$ may be optionally substituted, and may each independently be two or more types of arylene groups. The symbol * represents a binding site to the constituent unit of the general formula (S1) or another constituent unit.

[Chemical Formula 2]

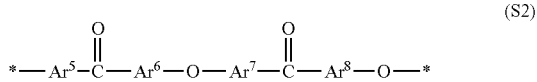

(S2)

In the general formula (S2), $Ar^5$ to $Ar^8$ each represent any divalent arylene group and may be optionally substituted, but do not contain an ionic group. $Ar^5$ to $Ar^8$ may each independently be two or more types of arylene groups. The symbol * represents a binding site to the constituent unit of the general formula (S2) or another constituent unit.

Herein, examples of the divalent arylene group preferable for $Ar^1$ to $Ar^8$ include hydrocarbon arylene groups such as a phenylene group, a naphthylene group, a biphenylene group, and a fluorenediyl group, and heteroarylene groups such as pyridinediyl, quinoxalinediyl, and thiophenediyl, but are not limited thereto. Herein, as for the "phenylene group", there may be three types of phenylene groups including an o-phenylene group, a m-phenylene group, and a p-phenylene group depending on the position of the binding site between the benzene ring and another constituent unit, and the term "phenylene group" is used as a generic term for those groups unless otherwise specified herein. The same applies to other divalent arylene groups such as the "naphthylene group" and the "biphenylene group". $Ar^1$ to $Ar^8$ are preferably phenylene groups and ionic group-containing phenylene groups, most preferably p-phenylene groups and ionic group-containing p-phenylene groups. Further, $Ar^3$ to $Ar^8$ may be substituted with a group other than an ionic group, but it is more preferable that $Ar^3$ to $Ar^8$ be unsubstituted groups in terms of proton conductivity, chemical stability, and physical durability.

Further, in order to achieve sufficient dimensional stability, mechanical strength, physical durability, fuel barrier properties, and solvent resistance, the polymer electrolyte is preferably an aromatic hydrocarbon polymer having crystallinity. Herein, "having crystallinity" means that the polymer electrolyte has a crystallizable property and is capable of being crystallized when heated, or has already been crystallized.

Whether the polymer electrolyte has crystallinity or not is examined by differential scanning calorimetry (DSC) or wide-angle X-ray diffractometry. In the present invention, it is preferable that the heat of crystallization measured by differential scanning calorimetry after film formation be 0.1 J/g or more, or that the degree of crystallinity measured by wide-angle X-ray diffractometry be 0.5% or more. More specifically, when no crystallization peak is observed in the differential scanning calorimetry, it is considered that the polymer electrolyte has already been crystallized or is amorphous. When the polymer electrolyte has already been crystallized, the polymer electrolyte has a degree of crystallinity of 0.5% or more as measured by wide-angle X-ray diffractometry.

The aromatic hydrocarbon polymer having crystallinity may be poor in the processability into the electrolyte membrane. In such a case, a protecting group may be introduced into the aromatic hydrocarbon polymer to temporarily suppress the crystallinity. Specifically, the aromatic hydrocarbon polymer having crystallinity can be used as the polymer electrolyte in the present invention by forming a film from the aromatic hydrocarbon polymer in which a protecting group is introduced, and then deprotecting the polymer.

[Nonionic Fluorosurfactant]

The nonionic fluorosurfactant used in the present invention (hereinafter sometimes simply referred to as a "surfactant") is preferably a compound having a fluorine-containing group including a fluorinated alkyl group, a fluorinated alkenyl group, or a fluorinated aryl group, which results from substitution of a hydrogen atom in an alkyl group, an alkenyl group, or an aryl group with a fluorine atom, and a nonionic lyophilic group (a hydrophilic group or a lipophilic group).

The fluorine-containing group is preferably a perfluoroalkyl group, a perfluoroalkenyl group, or a perfluoroaryl group, which results from substitution of all the hydrogen atoms in an alkyl group, an alkenyl group, or an aryl group with fluorine atoms.

The fluorine-containing group is more preferably a fluorinated alkenyl group or a fluorinated aryl group because the group has an excellent surfactant effect, and is more preferably a fluorinated alkenyl group because the group has a flexible structure and exhibits a potent surfactant action.

The fluorine-containing group preferably has 2 or more carbon atoms, more preferably has 4 or more carbon atoms, particularly preferably has 6 or more carbon atoms. Meanwhile, the fluorine-containing group preferably has 20 or less carbon atoms, more preferably has 15 or less carbon atoms, particularly preferably has 10 or less carbon atoms. If the number of carbon atoms is less than 2, the nonionic fluorosurfactant may have high volatility and high water solubility, so that the surfactant may not remain in the electrolyte membrane, and the electrolyte membrane may have lower physical durability. If the number of carbon atoms exceeds 20, the nonionic fluorosurfactant may be phase-separated from the polymer electrolyte and the electrolyte membrane may have lower physical durability.

Specific examples of the fluorinated alkyl group include a fluorinated ethyl group, a fluorinated propyl group, a fluorinated butyl group, a fluorinated pentyl group, a fluorinated hexyl group, a fluorinated heptyl group, a fluorinated octyl group, a fluorinated nonyl group, and a fluorinated decyl group, but are not limited thereto.

Further, specific examples of the fluorinated alkenyl group include a fluorinated ethenyl group, a fluorinated propenyl group, a fluorinated butenyl group, a fluorinated pentenyl group, a fluorinated hexenyl group, a fluorinated heptenyl group, a fluorinated octenyl group, a fluorinated nonenyl group, and a fluorinated decenyl group, but are not limited thereto.

Above all, a fluorinated hexyl group, a fluorinated heptyl group, a fluorinated octyl group, a fluorinated nonyl group, a fluorinated decyl group, a fluorinated hexenyl group, a fluorinated heptenyl group, a fluorinated octenyl group, a fluorinated nonenyl group, and a fluorinated decenyl group are more preferable because they have low volatility and low water solubility and tend to remain in the electrolyte membrane. Herein, the "fluorinated ethyl group" encompasses five types of functional groups including a monofluoroethyl group, a difluoroethyl group, a trifluoroethyl group, a tetrafluoroethyl group, and a pentafluoroethyl group depending on the number of fluorine atoms included in one functional group, and the term "fluorinated ethyl group" herein is used as a generic term for those groups. The same applies to other functional groups such as the "fluorinated propyl group" and the "fluorinated butyl group". Further, the "difluoroethyl group" is a functional group having two fluorine atoms, and there are three types of structural isomers including a 1,1-difluoroethyl group, a 1,2-difluoroethyl group, and a 2,2-difluoroethyl group. The term "difluoroethyl group" herein is used as a generic term for those groups. The same applies to other functional groups such as the "trifluoroethyl group" and the "tetrafluoroethyl group".

The fluorine-containing group may have a linear, branched, or cyclic structure. The branched structure is preferable because the structure may weaken the interaction between the fluorine compound molecules and may easily lower the surface tension of the surfactant. In the present invention, a surfactant having a fluorine-containing group including a structure represented by the following formula (F1) is particularly preferable.

[Chemical Formula 3]

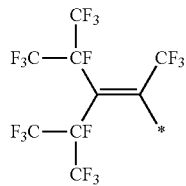

(F1)

In the formula (F1), the symbol * means a binding site with another atomic group.

The nonionic fluorosurfactant is suitably a compound containing 10 mass % or more of fluorine atoms in one molecule. The nonionic fluorosurfactant is more preferably a compound containing 20 mass % or more of fluorine atoms, still more preferably a compound containing 40 mass % or more of fluorine atoms. If the content of fluorine atoms in one molecule is less than 10 mass %, the affinity with the catalyst layer may be insufficient, and a sufficient effect of improving the power generation performance may not be obtained. Further, since the nonionic fluorosurfactant has high solubility in water and acids, the nonionic fluorosurfactant may be dissolved in water or an acid generated during the operation of an electrochemical cell such as a fuel cell, and eluted from the electrolyte membrane. Therefore, the affinity between the polymer electrolyte and the catalyst layer may be reduced.

The lyophilic group may be a hydrophilic group or a lipophilic group, but is preferably a hydrophilic group.

The hydrophilic group is not particularly limited as long as it is a nonionic group having a hydrophilic element selected from the group consisting of oxygen, nitrogen, phosphorus, sulfur, and boron. The hydrophilic group is preferably a group including a polyether group, a carboxylic acid ester group, a sulfonic acid ester group, a phosphorus acid ester group, or a phosphoric acid ester group, and is more preferably a group including a polyether group because the polyether group is excellent in the affinity with the polymer electrolyte due to a hydrogen bond formed between the polyether group and the ionic group, and is also excellent in chemical stability. Above all, it is preferable that the hydrophilic group be a group having a polyalkyl ether structure represented by the following general formula (C1) or a polyacrylate structure represented by the following general formula (C2), and it is particularly preferable that the hydrophilic group be a polyalkyl ether represented by the following general formula (C1) because the group is excellent in the affinity with the polymer electrolyte.

[Chemical Formula 4]

(C1)

(C2)

In the general formula (C1), q and r are natural numbers that satisfy r=2q, and s is an integer of 1 or more and 1,000 or less and means a repeating number of alkyl ether structures. In the general formula (C2), R is at least one group selected from an alkyl group having 1 to 20 carbon atoms, an alkenyl group having 1 to 20 carbon atoms, and an aryl group having 6 to 20 carbon atoms, and t is an integer of 1 or more and 1,000 or less and means a repeating number of acrylate structures. In the general formula (C1) or (C2), when s or t is 2 or more, the plurality of alkyl ether structures or acrylate structures may be identical or different.

Examples of the lipophilic group include an alkyl group, an alkenyl group, an alkynyl group, and a phenyl group that do not include a fluorine atom.

In the present invention, the nonionic fluorosurfactant is preferably a compound having a vapor pressure at 150° C. of less than 2 kPa, more preferably a compound having a vapor pressure at 150° C. of 1 kPa or less, and most preferably a compound having no boiling point, that is, a compound that starts thermal decomposition without boiling. In the present invention, it is particularly preferable that the surfactant be a compound having a 5% weight loss temperature of 150° C. or more in thermogravimetry-differential thermal analysis. Such a surfactant can remain in the electrolyte membrane since it does not volatilize or decompose during film formation.

In the present invention, the nonionic fluorosurfactant is preferably a compound having a weight average molecular weight of 1,000 or more, more preferably 1,500 or more, still more preferably 2,000 or more. Meanwhile, the nonionic fluorosurfactant is preferably a compound having a weight average molecular weight of 10,000 or less, more preferably 8,000 or less, still more preferably 5,000 or less. If the weight average molecular weight of the surfactant is less than 1,000, the surfactant may have high volatility and may be easily dissolved in a solvent such as water. Therefore, the affinity between the polymer electrolyte and the porous substrate or the catalyst layer may be reduced due to volatilization of the surfactant during film formation or elution of the surfactant during use of the electrolyte membrane, and the membrane may be delaminated or broken at the interface between them to have lower durability. If the weight average molecular weight of the surfactant exceeds 10,000, only the surfactant aggregates in the electrolyte membrane to form a sea-island-like phase-separated structure. Therefore, the membrane may be broken at the interface between the surfactant and the polymer electrolyte or the porous substrate to have lower durability.

In the surfactant, the fluorine-containing group preferably has a molecular weight of 200 or more, more preferably 400 or more, still more preferably 1,000 or more. Meanwhile, the fluorine-containing group preferably has a molecular weight of 5,000 or less, more preferably 3,000 or less, still more preferably 2,000 or less. If the molecular weight of the fluorine-containing group is less than 200, the molecular chain of the fluorine-containing group has insufficient flexibility and degree of freedom. Therefore, the affinity with the porous substrate or the catalyst layer may be reduced, and the membrane may be delaminated or broken at the interface with the polymer electrolyte to have lower durability. If the molecular weight of the fluorine-containing group exceeds 5,000, only the surfactant aggregates in the electrolyte membrane to form a sea-island-like phase-separated structure. Therefore, the membrane may be broken at the interface between the surfactant and the polymer electrolyte or the porous substrate to have lower durability.

In the case of a surfactant having a hydrophilic group as the lyophilic group, the molecular weight of the hydrophilic group is preferably 100 or more, more preferably 200 or more, still more preferably 500 or more. Meanwhile, the molecular weight of the hydrophilic group is preferably 4,000 or less, more preferably 2,500 or less, still more preferably 1,500 or less. If the molecular weight of the hydrophilic group is less than 100, the molecular chain of the hydrophilic group has insufficient flexibility and degree of freedom. Therefore, the affinity with the polymer electrolyte may be reduced, and the membrane may be broken at the interface with the porous substrate to have lower durability. If the molecular weight of the hydrophilic group exceeds 4,000, the surfactant may be dissolved in water or an acid generated during the operation of an electrochemical cell such as a fuel cell due to increased water solubility, and eluted from the electrolyte membrane. Therefore, the affinity between the polymer electrolyte and the porous substrate may be reduced, and the membrane may be broken at the interface between the polymer electrolyte and the porous substrate upon dimensional change to have lower durability.

The surfactant is preferably a compound that is insoluble in water, 10% sulfuric acid, or a 10% aqueous sodium hydroxide solution, more preferably a compound that is insoluble in water, and most preferably a compound that is insoluble in any of these. Herein, "insoluble" means that the surfactant has a saturated solubility at 25° C. of less than 0.1 mass %. If the surfactant is soluble in the above-mentioned solvent and/or solution, the surfactant may be dissolved in water or an acid generated during the operation of an electrochemical cell such as a fuel cell, and eluted from the electrolyte membrane. Therefore, the affinity between the polymer electrolyte and the porous substrate or the catalyst layer may be reduced, and the membrane may be delaminated or broken at the interface between the polymer electrolyte and the porous substrate or the catalyst layer upon dimensional change to have lower durability.

Examples of the nonionic fluorosurfactant used in the present invention include MEGAFACE® F-251, F-253, F-281, F-430, F-477, F-551, F-552, F-553, F-554, F-555, F-556, F-557, F-558, F-559, F-560, F-561, F-562, F-563, F-565, F-568, F-570, F-572, F-574, F-575, F-576, R-40, R-40-LM, R-41, R-94, RS-56, RS-72-K, RS-75, RS-76-E, RS-76-NS, DS-21, F444, and TF-2066 manufactured by Dainippon Ink & Chemicals, Inc., Surflon® S-141, S-145, S-241, S-242, S-243, S-386, S-420, S-611, and S-651 manufactured by Asahi Glass Co., Ltd., Ftergent® 251, 208M, 212M, 215M, 250, 209F, 222F, 245F, 208G, 218GL, 240G, 212P, 220P, 228P, FTX-218, DFX-18, 710FL, 710FM, 710FS, 730FL, 730FM, 610FM, 683, 601AD, 601ADH2, 602A, 650AC, and 681 manufactured by NEOS COMPANY LIMITED, EF-PP31N04, EF-PP31N09, EF-PP31N15, and EF-PP31N22 manufactured by Mitsubishi Materials Electronic Chemicals Co., Ltd., FC-4430 and FC-4432 manufactured by 3M Company, PF-151N, PF-636, PF-6320, PF-656, PF-6520, PF-652-NF, and PF-3320 manufactured by OMNOVA Solutions Inc., TG-9131 and ZEFFLE® GH-701 manufactured by DAIKIN INDUSTRIES, LTD., and Fluorolink® A10-P manufactured by Solvay Specialty Polymers Japan K.K.

The electrolyte membrane preferably has a content of the nonionic fluorosurfactant, in terms of the mass ratio to the total amount of the polymer electrolyte contained in the electrolyte membrane, of 0.005 or more, more preferably 0.01 or more. Meanwhile, the content of the nonionic fluorosurfactant is preferably 0.20 or less, more preferably 0.10 or less. If the ratio is less than 0.005, the affinity between the polymer electrolyte and the fluorine-containing polymer porous substrate or the catalyst layer may be reduced, and the membrane may be delaminated or broken at the interface between the polymer electrolyte and the fluorine-containing polymer porous substrate or the catalyst layer upon dimensional change to have lower durability. Meanwhile, if the ratio exceeds 0.20, the amount of the surfactant is excessive, and the electrolyte membrane may have lower proton conductivity. It is to be noted that the content of the surfactant herein is the amount of the surfactant remaining in the completed electrolyte membrane, and excludes the amount of the surfactant lost during the production process.

Examples of a method for analyzing the nonionic fluorosurfactant contained in the electrolyte membrane include a method of dissolving the nonionic fluorosurfactant together with the polymer electrolyte membrane in a predetermined solvent. It is possible to analyze the chemical structures of various surfactants and calculate the content of the surfactant by subjecting the polymer electrolyte membrane solution and a dried product obtained by removing the solvent from the solution to infrared spectroscopy (IR), $^1$H nuclear magnetic resonance (NMR) analysis, $^{19}$F NMR analysis, MALDI-MS analysis, or pyrolysis GC/MS analysis. In addition, it is also suitable to extract only the nonionic fluorosurfactant by subjecting the solution and the dried product to general purification treatment such as solvent extraction or reprecipitation, and analyze the nonionic fluorosurfactant.

The solvent used in the analysis of the nonionic surfactant may be appropriately selected according to the polymer species that constitutes the polymer electrolyte membrane. Examples of the suitably used solvent include aprotic polar solvents such as N,N-dimethylacetamide, N,N-dimethylformamide, N-methyl-2-pyrrolidone, dimethyl sulfoxide, sulfolane, 1,3-dimethyl-2-imidazolidinone, and hexamethylphosphone triamide, ester solvents such as γ-butyrolactone, ethyl acetate, and butyl acetate, carbonate solvents such as ethylene carbonate and propylene carbonate, alkylene glycol monoalkyl ethers such as ethylene glycol monomethyl ether, ethylene glycol monoethyl ether, propylene glycol monomethyl ether, and propylene glycol monoethyl ether, alcohol solvents such as methanol, ethanol, 1-propanol, and isopropyl alcohol, ketone solvents such as acetone, methyl ethyl ketone, and methyl isobutyl ketone, ester solvents such as ethyl acetate, butyl acetate, and ethyl lactate, hydrocarbon solvents such as hexane and cyclohexane, aromatic hydrocarbon solvents such as benzene, toluene, and xylene, halogenated hydrocarbon solvents such as chloroform, dichloromethane, 1,2-dichloroethane, perchloroethylene, chlorobenzene, and dichlorobenzene, ether solvents such as diethyl ether, tetrahydrofuran, and 1,4-dioxane, nitrile solvents such as acetonitrile, nitrated hydrocarbon solvents such as nitromethane and nitroethane, and water. A mixed solvent that is a mixture of two or more types of these solvents may also be used.

When the polymer electrolyte membrane is insoluble, a different analytical technique can be used. The polymer electrolyte membrane itself containing the nonionic fluorosurfactant may be subjected to IR, solid-state NMR analysis, MALDI-MS analysis, or pyrolysis GC/MS analysis to analyze the chemical structure and the content of the surfactant. Analysis performed by immersing the polymer electrolyte membrane in a solvent to dissolve and extract only the nonionic fluorosurfactant is also suitable.

The nonionic fluorosurfactant used in the present invention is preferably a surfactant containing no metals as impurities. Herein, the "metals" include simple metal elements, metal ions, nonionic metal compounds, and metal oxides, but are not limited thereto. If the nonionic fluorosurfactant contains metals, the metals may interact with the hydrophilic group or lipophilic group of the nonionic fluorosurfactant, so that these groups may have reduced degree of freedom in the polymer electrolyte membrane and the surfactant may be reduced in the function. Therefore, the membrane may be delaminated or broken at the interface between the polymer electrolyte and the porous substrate or the catalyst layer upon dimensional change to have lower durability.

[Fluorine-Containing Polymer Porous Substrate]

It is more preferable that the electrolyte membrane of the present invention be an electrolyte membrane having a composite layer (hereinafter, such electrolyte membrane is sometimes simply referred to as a "composite electrolyte membrane"). The composite layer is a composite of the polymer electrolyte and a fluorine-containing polymer porous substrate (hereinafter sometimes simply referred to as a "porous substrate"). In such an aspect, not only an effect of improving the bondability between the polymer electrolyte and the catalyst layer but also an effect of improving the bondability between the polymer electrolyte and the porous substrate is obtained, and the electrolyte membrane may have high durability and dimensional stability in addition to high power generation performance. Herein, the "composite" means a state in which the pores included in the fluorine-containing polymer porous substrate are filled with the polymer electrolyte, and the "composite layer" means a layer of the polymer electrolyte membrane having a structure in which the pores in the fluorine-containing polymer porous substrate are filled with the polymer electrolyte.

The fluorine-containing polymer porous substrate is a porous substrate formed by molding a fluorine atom-containing polymer. Since the fluorine atom-containing polymer is generally a hydrophobic compound, the fluorine atom-containing polymer may impart, by forming a composite with the polymer electrolyte, water resistance to the electrolyte membrane to suppress dimensional change of the electrolyte membrane upon water absorption. In addition, since a fluorine atom-containing polymer compound generally has low solubility in chemicals and is stable to chemical reactions, the compound can impart chemical resistance and chemical durability to the electrolyte membrane.

From the viewpoint of water resistance, the fluorine-containing polymer porous substrate is preferably a porous substrate containing 50 mass % or more of fluorine atoms, more preferably a porous substrate containing 60 mass % or more of fluorine atoms, and particularly preferably a porous substrate containing 70 mass % or more of fluorine atoms. The fluorine atom content of the fluorine-containing polymer porous substrate is a value measured by burning the porous substrate to generate a gas, making a solution absorb the gas, and subjecting the solution having absorbed the gas to ion chromatography. Specifically, the fluorine atom content can be measured by the method described in item (10) in the section of EXAMPLES described later.

In the present invention, it is preferable that the fluorine-containing polymer porous substrate be a porous substrate having an oxygen atom content measured by X-ray photoelectron spectroscopy (XPS) of 10 mass % or less. The oxygen atom content of the fluorine-containing polymer porous substrate is more preferably 8% or less, still more preferably 5% or less. If the oxygen atom content exceeds 10%, the fluorine-containing polymer porous substrate may have increased water absorbability, and the composite electrolyte membrane may undergo significant dimensional change upon water absorption. Specifically, the oxygen atom content of the fluorine-containing polymer porous substrate can be measured by the method described in item (15) in the section of EXAMPLES described later.

Incidentally, when the fluorine-containing polymer porous substrate present in the composite electrolyte membrane forming a composite with the polymer electrolyte is analyzed, it is possible to extract only the fluorine-containing polymer porous substrate by immersing the composite electrolyte membrane in a solvent that dissolves only the polymer electrolyte.

Examples of the fluorine atom-containing polymer as a material of the fluorine-containing polymer porous substrate include polytetrafluoroethylene (PTFE), polyhexafluoropropylene, a tetrafluoroethylene-hexafluoropropylene copolymer (FEP), an ethylene-tetrafluoroethylene copolymer (ETFE), polyvinylidene difluoride (PVdF), polychlorotrifluoroethylene (PCTFE), a perfluoroalkoxy fluororesin (PFA), and an ethylene-chlorotrifluoroethylene copolymer (ECTFE), but are not particularly limited thereto. PTFE, polyhexafluoropropylene, FEP, and PFA are preferable from the viewpoint of water resistance, and PTFE is particularly preferable because it has high mechanical strength due to molecular orientation.

Examples of the form of the fluorine-containing polymer porous substrate include: a stretched microporous film obtained by stretching a pore-free fluorine atom-containing polymer film in the film plane direction to form micropores; a wet-solidified microporous film obtained by preparing a solution of a fluorine atom-containing polymer compound, forming a film from the compound, and immersing the film in a poor solvent for the fluorine atom-containing polymer compound in a state where the film still contains the solvent to solidify the film; a nonwoven fabric made from a solution-spun fiber that is obtained by spinning a solution of a fluorine atom-containing polymer compound; and a nonwoven fabric made from a melt-spun fiber that is obtained by melt-spinning a fluorine atom-containing polymer compound.

Examples of the solution spinning method include: a dry spinning method in which a fluorine atom-containing polymer solution is discharged from a spinneret into a fiber shape under high pressure, and the solution is dried with hot air; a wet spinning method in which a fluorine atom-containing polymer solution is discharged into a fiber shape, and the solution is immersed in a poor solvent for the fluorine atom-containing polymer compound to be solidified; and electrospinning in which a fluorine atom-containing polymer solution is discharged into a space to which a high voltage is applied, and the solution is pulled into a fiber shape by static electricity.

Examples of the melt spinning method include melt-blown spinning in which a molten fluorine atom-containing polymer is discharged from a spinneret into a fiber shape.

The thickness of the fluorine-containing polymer porous substrate used in the present invention is not particularly limited, and is determined according to the use of the composite electrolyte membrane. A fluorine-containing polymer porous substrate having a film thickness of 0.5 μm or more and 50 μm or less is practically used, and a fluorine-containing polymer porous substrate having a film thickness of 2 μm or more and 40 μm or less is preferably used.

The porosity of the fluorine-containing polymer porous substrate before forming a composite with the polymer electrolyte is not particularly limited. However, from the viewpoint of achieving both the proton conductivity and the mechanical strength of the composite electrolyte membrane obtained from the fluorine-containing polymer porous substrate, the porosity of the fluorine-containing polymer porous substrate is preferably 50 to 98%, more preferably 80% to 98%. The porosity Y1 (volume %) of the fluorine-containing polymer porous substrate is defined as a value calculated by the following mathematical formula.

$$Y1=(1-Db/Da) \times 100$$

Da: specific gravity of the polymer compound that constitutes the fluorine-containing polymer porous substrate Db: specific gravity of the entire fluorine-containing polymer porous substrate The filling rate of the polymer electrolyte in the composite layer is preferably 50% or more, more preferably 60% or more. If the filling rate in the composite layer is low, the power generation performance may deteriorate due to loss of the proton conduction path. The filling rate in the composite layer in the present invention is a value indicating the percentage of the polymer electrolyte in the total volume of the composite layer, and can be calculated from the IEC. Specifically, the filling rate is calculated by the method described in item (3) in the section of EXAMPLES.

The composite electrolyte membrane may have, on either side or one side of the composite layer, a polymer electrolyte layer that does not form a composite with a reinforcing material such as a porous substrate. When the composite electrolyte membrane has such a layer, it is possible to improve the bondability between the electrolyte membrane and the electrode, and to suppress interface delamination. When a polymer electrolyte layer that does not form a composite with a reinforcing material is formed in contact with either side or one side of the composite layer, the polymer electrolyte that constitutes the polymer electrolyte layer is preferably the same polymer as the polymer electrolyte filled in the composite layer.

Such a composite electrolyte membrane having the composite layer can be reduced in the dimensional change rate in the plane direction. A smaller dimensional change rate of the composite electrolyte membrane in the plane direction thereof, in use of the composite electrolyte membrane as an electrolyte membrane of a fuel cell, can reduce the stress due to swelling and shrinkage of the electrolyte membrane at the edge portion during a dry-wet cycle, and easily improve the durability. The dimensional change rate $\lambda_{xy}$ of the composite electrolyte membrane in the plane direction thereof is preferably 10% or less, more preferably 8% or less, still more preferably 5% or less.

Further, the dimensional change rate of the composite electrolyte membrane in the plane direction thereof is preferably small in MD and TD anisotropy. Herein, "MD" is an abbreviation for Machine Direction, and means the direction in which the fluorine-containing polymer porous substrate, the coater, or the coated substrate is moved in the production process of the composite electrolyte membrane described later. Which of the fluorine-containing polymer porous substrate, the coater, and the coated substrate is to be moved is appropriately determined according to the coating process and is not particularly limited. When a process in which a plurality of elements among the fluorine-containing polymer porous substrate, the coater, and the coated substrate are moved is employed, usually, all the elements are often moved in the same direction. However, a process in which the elements are moved in different directions may be employed. In this case, whether or not the coated substrate (1), the coater (2), and the fluorine-containing polymer porous substrate (3) are moved is judged in this order, and the moving direction of the element in the first place among the moving elements is defined as the MD. "TD" is an abbreviation for Traverse Direction, and is a direction orthogonal to the MD in the plane direction of the composite electrolyte membrane.

If the composite electrolyte membrane has large anisotropy, the cell design of the fuel cell may be restricted, or the stress due to swelling and shrinkage of the membrane may concentrate on the edge orthogonal to the direction in which the dimensional change is large, and the electrolyte membrane may start to break at the edge portion. Specifically, it is preferable that the ratio of the dimensional change rate in the MD ($\lambda_{MD}$) to the dimensional change rate in the TD ($\lambda_{TD}$), that is, $\lambda_{MD}/\lambda_{TD}$ satisfy $0.5 \leq \lambda_{MD}/\lambda_{TD} \leq 2.0$.

Herein, the dimensional change rate is an index representing the change between the dimension of the composite electrolyte membrane in a dry state and the dimension of the composite electrolyte membrane in a wet state. Specifically, the dimensional change rate is measured by the method described in item (5) in the section of EXAMPLES.

The thickness of the composite layer in the composite electrolyte membrane is not particularly limited, but is preferably 0.5 µm or more and 50 µm or less, more preferably 2 µm or more and 40 µm or less. When the composite layer is thick, the electrolyte membrane tends to have improved physical durability, but tends to have increased membrane resistance. On the contrary, when the composite layer is thin, the power generation performance is improved, but the electrolyte membrane tends to have a problem in the physical durability and tends to cause problems such as electrical short circuit and fuel permeation.

[Catalyst Layer]

The catalyst layer is a layer containing catalyst particles and formed in contact with either side of the electrolyte membrane, and is generally a layer containing catalyst particles and a polymer electrolyte containing a fluoropolymer electrolyte. An aspect in which the catalyst layer contains a polymer electrolyte containing a fluoropolymer electrolyte is particularly preferable because an effect of improving the bondability is remarkably exhibited. As the fluoropolymer electrolyte, those described above can be used.

In the catalyst coated membrane of the present invention, it is preferable that the catalyst layer contain an ionic group-containing perfluoro polymer in terms of power generation performance and chemical durability. Use of an ionic group-containing perfluoro polymer may increase the acidity of the ionic group contained in the catalyst layer to further improve the proton conductivity, and a large number of chemically stable C—F bonds can further improve the chemical durability of the catalyst layer.

As the catalyst particles, catalyst-supporting carbon particles containing a catalyst substance supported on carbon particles are generally used. Examples of the catalyst substance include not only platinum but also platinum elements such as palladium, ruthenium, iridium, rhodium, and osmium, metals such as iron, lead, copper, chromium, cobalt, nickel, manganese, vanadium, molybdenum, gallium, and aluminum, and alloys, oxides, and double oxides of these metals. The type of carbon particles is not particularly limited as long as they are in the form of fine particles, have conductivity, and do not corrode or deteriorate due to a reaction with the catalyst. Carbon particles such as carbon black, graphite, black lead, activated carbon, carbon fibers, carbon nanotubes, and fullerene particles can be used.

The mass ratio of the content of the polymer electrolyte to the content of the catalyst particles in the catalyst layer is preferably within the range of 0.2 or more and 2.5 or less, particularly preferably 0.5 or more and 2.0 or less. If the ratio is less than 0.2, the catalyst layer may crack. If the ratio is more than 2.5, gas diffusivity may be impaired, and the power generation performance may deteriorate.

The thickness of the catalyst layer is preferably 0.03 µm to 2,000 µm. In order to easily obtain good power generation performance and durability, the thickness of the catalyst layer is more preferably 0.5 µm or more, particularly preferably 1 to 30 µm.

<Method for Producing Electrolyte Membrane>

In one example, the electrolyte membrane of the present invention can be produced as follows: applying, to a substrate, a polymer electrolyte-surfactant mixed solution (hereinafter sometimes simply referred to as a "mixed solution"), which is obtained by dissolving a polymer electrolyte and a nonionic fluorosurfactant in a solvent, by cast coating, and then drying the mixed solution to remove the solvent.

As described above, the content of the surfactant in the mixed solution is preferably 0.005 or more, more preferably 0.01 or more in terms of the mass ratio to the total amount of the polymer electrolyte. Meanwhile, the content of the surfactant is preferably 0.20 or less, more preferably 0.10 or less. If the ratio is less than 0.005, the affinity between the polymer electrolyte and the catalyst layer may be reduced, and the effect of improving the power generation performance may not be sufficiently obtained. Meanwhile, if the ratio exceeds 0.20, the amount of the surfactant is excessive, and the electrolyte membrane may have lower proton conductivity.

The solvent used in the mixed solution can be appropriately selected according to the polymer species. Examples of the suitably used solvent include aprotic polar solvents such as N,N-dimethylacetamide, N,N-dimethylformamide, N-methyl-2-pyrrolidone, dimethyl sulfoxide, sulfolane, 1,3-dimethyl-2-imidazolidinone, and hexamethylphosphone triamide, ester solvents such as γ-butyrolactone, ethyl acetate, and butyl acetate, carbonate solvents such as ethylene carbonate and propylene carbonate, alkylene glycol monoalkyl ethers such as ethylene glycol monomethyl ether, ethylene glycol monoethyl ether, propylene glycol monomethyl ether, and propylene glycol monoethyl ether, alcohol solvents such as methanol, ethanol, 1-propanol, and isopropyl alcohol, ketone solvents such as acetone, methyl ethyl ketone, and methyl isobutyl ketone, ester solvents such as ethyl acetate, butyl acetate, and ethyl lactate, hydrocarbon solvents such as hexane and cyclohexane, aromatic hydrocarbon solvents such as benzene, toluene, and xylene, halogenated hydrocarbon solvents such as chloroform, dichloromethane, 1,2-dichloroethane, perchloroethylene, chlorobenzene, and dichlorobenzene, ether solvents such as diethyl ether, tetrahydrofuran, and 1,4-dioxane, nitrile solvents such as acetonitrile, nitrated hydrocarbon solvents such as nitromethane and nitroethane, and water. A mixed solvent that is a mixture of two or more types of these solvents may also be used.

The concentration of the polymer electrolyte in the mixed solution is preferably 5 to 40 mass %, more preferably 10 to 25 mass %. When the concentration is within the above-mentioned range, an electrolyte membrane excellent in surface smoothness can be easily obtained. If the concentration in the mixed solution is too low, the solution viscosity may be too low and the film thickness of the electrolyte membrane may become uneven. Meanwhile, if the concentration in the electrolyte-surfactant mixed solution is too high, the solution viscosity may be too high and the surface smoothness of the electrolyte membrane may deteriorate.

The solution viscosity of the mixed solution is preferably 100 to 50,000 mPa·s, more preferably 300 to 10,000 mPa·s. If the solution viscosity is too low, the film thickness of the electrolyte membrane may become uneven. Meanwhile, if the solution viscosity is too high, the surface smoothness of the electrolyte membrane may deteriorate.

As for a method for applying the mixed solution by cast coating, techniques such as knife coating, direct roll coating, Meyer bar coating, gravure coating, reverse coating, air knife coating, spray coating, brush coating, dip coating, die coating, vacuum die coating, curtain coating, flow coating, spin coating, screen printing, and inkjet coating can be applied. Herein, an apparatus used for applying the mixed solution by cast coating is called a coater.

After the mixed solution is applied to the substrate, the mixed solution is subjected to a drying step to form an electrolyte membrane. In the drying step, the coating film of the electrolyte-surfactant mixed solution is heated to evaporate the solvent. The heating means is not particularly limited as long as the means can evaporate the solvent. For example, a heating device such as an oven and a heater, a device for controlling the temperature in the vicinity of the electrolyte membrane with infrared rays, warm air, or the like can be used. Further, heat may be conducted to the coating film via the substrate. As for the heating temperature range, the temperature is preferably close to the boiling point of the solvent and equal to or lower than the glass transition temperature of the electrolyte membrane. It is also possible to remove the solvent only by reducing the pressure or introducing an air flow without heating the coating film.

The drying time and the drying temperature in the drying step can be appropriately determined experimentally, but it is preferable to dry the mixed solution at least to such an extent that a self-supporting membrane is obtained after the membrane is separated from the substrate. The drying method may be selected from known methods such as heating of the substrate, hot air, and an infrared heater. The drying temperature is preferably 200° C. or less, more preferably 150° C. or less in consideration of decomposition of the polymer electrolyte and the surfactant.

The polymer electrolyte in the mixed solution may be an electrolyte in which the ionic group forms a salt with a cation of an alkali metal or an alkaline earth metal. In this case, the method may include, after the step of forming a membrane on the substrate and preferably subjecting the membrane to the drying step, a step of exchanging the cation of an alkali metal or an alkaline earth metal with a proton. This step is preferably a step of bringing the formed membrane into contact with an acidic aqueous solution. Further, it is more preferable that the membrane be brought into contact with the acidic aqueous solution by a step of immersing the formed membrane in the acidic aqueous solution. In this step, the proton in the acidic aqueous solution is substituted with the cation that is ionically bonded to the ionic group, and residual water-soluble impurities, residual monomers, solvents, residual salts, and the like are simultaneously removed. The acidic aqueous solution is not particularly limited, and sulfuric acid, hydrochloric acid, nitric acid, acetic acid, trifluoromethanesulfonic acid, methanesulfonic acid, phosphoric acid, citric acid, or the like is preferably used. The temperature and concentration of the acidic aqueous solution are appropriately determined. From the viewpoint of productivity, it is preferable to use an aqueous sulfuric acid solution of 3 mass % or more and 30 mass % or less at a temperature of 0° C. or more and 80° C. or less.

[Method for Producing Composite Electrolyte Membrane]

In a first aspect of the present invention, the composite electrolyte membrane can be produced by impregnating the fluorine-containing polymer porous substrate with an impregnating solution, that is, the polymer electrolyte-surfactant mixed solution as a mixture of the polymer electrolyte and the nonionic fluorosurfactant, and then drying the impregnating solution to remove the solvent contained in the impregnating solution. The details of the polymer electrolyte, the fluorine-containing polymer porous substrate, and the nonionic fluorosurfactant used in the production methods of the first aspect and a second aspect described later are as described above, and are omitted here.

Further, in the second aspect of the present invention, the composite electrolyte membrane can be produced by impregnating the fluorine-containing polymer porous substrate, to which the nonionic fluorosurfactant is previously applied, with an impregnating solution, that is, a polymer electrolyte solution, and then drying the impregnating solution to remove the solvent contained in the impregnating solution.

In this case, examples of the method for applying the surfactant to the fluorine-containing polymer porous substrate include:

(1) a method of pulling up the fluorine-containing polymer porous substrate immersed in a surfactant solution and removing the excess solution to control the amount of the applied solution;

(2) a method of applying a surfactant solution to the fluorine-containing polymer porous substrate by cast coating; and (3) a method of bonding the fluorine-containing polymer porous substrate onto a support substrate to which a surfactant solution is applied by cast coating to impregnate the fluorine-containing polymer porous substrate with the surfactant solution.

When the surfactant is liquid or oily, the surfactant itself may be impregnated into the porous substrate in place of the surfactant solution. However, it is preferable to use the surfactant solution containing the surfactant dissolved in a predetermined solvent for the purpose of adjusting the viscosity so that the surfactant may easily penetrate into the porous substrate, or diluting the surfactant solution so that an excessive amount of the surfactant may not be applied to the porous substrate.

As for a method for applying the surfactant solution by cast coating, techniques such as knife coating, direct roll coating, Meyer bar coating, gravure coating, reverse coating, air knife coating, spray coating, brush coating, dip coating, die coating, vacuum die coating, curtain coating, flow coating, spin coating, screen printing, and inkjet coating can be applied.

In the second aspect, the surfactant is preferably applied in an amount of 5 mass % or more, more preferably 10 mass % or more based on 100 mass % of the porous substrate. Similarly, the surfactant is preferably applied in an amount of 30 mass % or less, more preferably 20 mass % or less. If the amount of the surfactant is less than 5 mass %, the affinity between the polymer electrolyte and the porous substrate may be reduced, and a composite may not be formed. If the amount of the surfactant exceeds 30 mass %, the amount of the surfactant is excessive and the surfactant may block the pores of the porous substrate, and the composite electrolyte membrane may have lower proton conductivity.

Further, in the second aspect, by the application of the surfactant, the contact angle of the solvent used in the polymer electrolyte solution with the surface of the porous substrate is preferably 120° or less, more preferably 80° or less, still more preferably 50° or less. If the contact angle exceeds 120°, the polymer electrolyte solution may hardly impregnate into the surfactant-containing porous substrate.

Further, in the second aspect, it is preferable to use, as the surfactant, a compound insoluble in the solvent of the polymer electrolyte solution to be impregnated into the porous substrate. Use of such a surfactant prevents the diffusion of the surfactant into the polymer electrolyte from the surface of the porous substrate or the surface of the composite electrolyte membrane in contact with the catalyst layer upon impregnation of the porous substrate with the polymer electrolyte solution, and makes it possible to prevent the reduction of proton conductivity due to the presence of the surfactant while sufficiently exhibiting the function of the surfactant.

In the first and second aspects, the concentration of the polymer electrolyte in the impregnating solution is preferably 3 to 40 mass %, more preferably 5 to 25 mass %. When the concentration is within the above-mentioned range, the polymer electrolyte can be sufficiently filled in the pores of the porous substrate, and a composite layer excellent in surface smoothness can be easily obtained. If the concentration of the polymer electrolyte is too low, the filling efficiency of the polymer electrolyte into the pores of the fluorine-containing polymer porous substrate may be reduced, and a plurality of times of immersion treatment may be required. Meanwhile, if the concentration of the polymer electrolyte is too high, the solution viscosity may be too high and the polymer may not be sufficiently filled in the pores of the porous substrate.

Examples of the method for impregnating the fluorine-containing polymer porous substrate with the impregnating solution (the "polymer electrolyte-surfactant mixed solution" in the first aspect or the "polymer electrolyte solution" in the second aspect) include:

(1) a method of pulling up the fluorine-containing polymer porous substrate immersed in the impregnating solution and removing the excess solution to control the film thickness;

(2) a method of applying the impregnating solution to the fluorine-containing polymer porous substrate by cast coating; and (3) a method of bonding the fluorine-containing polymer porous substrate onto a support substrate to which the impregnating solution is applied by cast coating to impregnate the fluorine-containing polymer porous substrate with the impregnating solution.

When the impregnating solution is impregnated into the fluorine-containing polymer porous substrate by the method (3), the solvent can be dried as it is. Alternatively, when the impregnating solution is impregnated into the fluorine-containing polymer porous substrate by the method (1) or (2), a method of drying the solvent of the impregnating solution in a state where the fluorine-containing polymer porous substrate is bonded to a separately prepared support substrate is preferable from the viewpoint of reducing the wrinkles and thickness unevenness of the composite electrolyte membrane and improving the membrane quality.

As for a method for applying the impregnating solution by cast coating, techniques such as knife coating, direct roll coating, Meyer bar coating, gravure coating, reverse coating, air knife coating, spray coating, brush coating, dip coating, die coating, vacuum die coating, curtain coating, flow coating, spin coating, screen printing, and inkjet coating can be applied.

[Method for Producing Catalyst Coated Membrane]

The catalyst coated membrane (CCM) of the present invention includes the electrolyte membrane of the present invention, and a catalyst layer on either side of the electrolyte membrane. The method for forming the catalyst layer is not particularly limited. However, a method of applying a catalyst layer ink and drying the catalyst layer ink, and a method of transferring, using a catalyst layer decal including a catalyst layer formed in advance on a decal substrate, the catalyst layer and then drying the catalyst layer are preferable since the methods have simple steps and can reduce the process cost.

In the case of the method of applying the catalyst layer ink, the application method is not particularly limited as long as the catalyst layer ink can be applied in a desired shape, and the methods described in the above-mentioned step of applying the mixed solution can be used.

The solvent contained in the catalyst layer ink is not particularly limited as long as it is a solvent in which the polymer electrolyte and the catalyst-supporting carbon particles can be dispersed, but a solvent that is easy to evaporate and remove by heating is preferable. For example, a solvent having a boiling point of 140° C. or less is preferable. Specific examples of the solvent of the catalyst layer ink include one solvent or a mixture of two or more solvents among water, alcohols such as methanol, ethanol, 1-propanol, 2-propanol, 1-butanol, 2-butanol, isobutyl alcohol, tert-butyl alcohol, and pentanol, ketones such as acetone, methyl ethyl ketone, pentanone, hexanone, heptanone, cyclohexanone, methylcyclohexanone, acetonylacetone, and diisobutyl ketone, ethers such as tetrahydrofuran, dioxane, diethylene glycol dimethyl ether, anisole, methoxytoluene, and dibutyl ether, esters such as methyl acetate, ethyl acetate, normal propyl acetate, isopropyl acetate, butyl acetate, methyl lactate, ethyl lactate, and butyl lactate, and dimethylformamide, dimethylacetamide, N-methylpyrrolidone, ethylene glycol, diethylene glycol, diacetone alcohol, and 1-methoxy-2-propanol.

In the case of the method of transferring the catalyst layer using the catalyst layer decal, first, the catalyst layer ink is applied to the substrate, and the catalyst layer is subjected to a drying step as necessary to produce the catalyst layer decal. Then, the electrolyte membrane is sandwiched between the catalyst layer decal on the cathode electrode side and the catalyst layer decal on the anode electrode side, and the resulting laminate is hot-pressed so that the surfaces of the decals on which each catalyst layer is provided may come into contact with the electrolyte membrane to produce a catalyst coated membrane. The temperature and pressure in the hot pressing may be appropriately selected according to the thickness and water content of the electrolyte membrane, the catalyst layer, and the decal substrate. From the viewpoint of industrial productivity and suppression of thermal decomposition of the electrolyte membrane material, the temperature is preferably within the range of 0° C. to 250° C., and is more preferably higher than the glass transition temperature of the polymer electrolyte contained in the catalyst layer and 200° C. or less. The pressure applied in the hot pressing is preferably as low as possible from the viewpoint of protecting the electrolyte membrane and the electrodes. In the case of plate pressing, a pressure of 10 MPa or less is preferable.

The decal substrate used in the application of the catalyst layer ink may be the same resin film or substrate as the substrate used in the formation of the electrolyte membrane. Moreover, fluororesins such as PTFE, polyhexafluoropropylene, ETFE, an ethylene-hexafluoropropylene copolymer, FEP, PFA, and PVdF can be used. From the viewpoint of chemical stability and releasability in addition to heat resistance and solvent resistance, it is preferable to use a fluororesin film.

The catalyst layer may be dried by the same method as the method described in the above-mentioned drying of the mixed solution.

[Use]

The electrolyte membrane of the present invention can be applied to various uses. For example, the electrolyte membrane can be applied to medical uses such as artificial skin, filtration uses, ion-exchange resin uses such as chlorine-resistant reverse osmosis membranes, various structural material uses, electrochemical uses, humidifying membranes, antifogging films, antistatic films, deoxidation films, solar battery films, and gas barrier films. Above all, the electrolyte membrane can be more preferably used in various electrochemical uses. Examples of the electrochemical uses include polymer electrolyte fuel cells, redox flow batteries, water electrolysis apparatuses, chlor-alkali electrolysis apparatuses, electrochemical hydrogen pumps, and water electrolysis hydrogen generators.

In the polymer electrolyte fuel cell, electrochemical hydrogen pump, or water electrolysis hydrogen generator, the electrolyte membrane is used in a state where a catalyst layer, an electrode substrate, and a separator are sequentially stacked on either side of the electrolyte membrane. In particular, a laminate including a catalyst layer and a gas diffusion substrate sequentially stacked on either side of the electrolyte membrane (that is, a laminate having a layer structure of gas diffusion substrate/catalyst layer/electrolyte membrane/catalyst layer/gas diffusion substrate) is referred to as a "membrane electrode assembly (MEA)". The electrolyte membrane of the present invention is suitably used as an electrolyte membrane that constitutes the CCM or MEA.

The membrane electrode assembly of the present invention and the polymer electrolyte fuel cell of the present invention include the electrolyte membrane of the present invention.

EXAMPLES

Hereinafter, the present invention will be more specifically described with reference to examples, but the present invention is not limited to these examples. Various measurement conditions are as follows.

(1) Molecular Weight of Polymer

The number average molecular weight and the weight average molecular weight of a polymer solution were measured by GPC. HLC-8022GPC manufactured by Tosoh Corporation was used as an ultraviolet detector-differential refractometer integrated device. Two TSKgel SuperHM-H columns (inner diameter: 6.0 mm, length: 15 cm) manufactured by Tosoh Corporation were used as GPC columns. The measurement was performed with an N-methyl-2-pyrrolidone solvent (N-methyl-2-pyrrolidone solvent containing 10 mmol/L of lithium bromide) at a flow rate of 0.2 mL/min, and the number average molecular weight and the weight average molecular weight were determined in terms of standard polystyrene.

(2) Ion Exchange Capacity (IEC)

The ion exchange capacity was measured by the neutralization titration method. The measurement was performed three times, and the average of the three measurements was adopted.

1. An electrolyte membrane was subjected to proton exchange and thoroughly washed with pure water, and water on the membrane surface was wiped off. Then, the electrolyte membrane was vacuum-dried at 100° C. for 12 hours or more, and the dry weight of the membrane was obtained.

2. To the electrolyte membrane, 50 mL of a 5 mass % aqueous sodium sulfate solution was added, and the electrolyte membrane was left standing for 12 hours for ion exchange.

3. The generated sulfuric acid was titrated using a 0.01 mol/L aqueous sodium hydroxide solution. A commercially available 0.1 w/v % phenolphthalein solution for titration was added as an indicator, and the point at which the solution turned pale red-purple was taken as the end point.

4. The IEC was calculated by the following formula.

IEC (meq/g)=[concentration (mmol/mL) of aqueous sodium hydroxide solution×dropping amount (mL) of aqueous sodium hydroxide solution]/dry weight (g) of sample (3) Filling Rate of Polymer Electrolyte in Composite Layer (Filling Rate in Composite Layer)

A cross section of a composite electrolyte membrane was observed with an optical microscope or a scanning electron microscope (SEM), and the thickness of the composite layer including the polymer electrolyte and the fluorine-containing polymer porous substrate was defined as T1, and when other layers were provided outside the composite layer, thicknesses of the layers were defined as T2 and T3. The specific gravity of the polymer electrolyte forming the composite layer was defined as D1, the specific gravities of the polymer electrolyte forming the other layers outside the composite layer were defined as D2 and D3, and the specific gravity of the composite electrolyte membrane was defined as D. With the IECs of the polymers forming the layers being I1, I2, and I3, and the IEC of the composite electrolyte membrane being I, the filling rate Y2 (volume %) of the polymer electrolyte in the composite layer was calculated by the following formula.

$$Y2=[(T1+T2+T3)\times D\times I-(T2\times D2\times I2+T3\times D3\times I3)]/(T1\times D1\times I3)\times 100$$

(4) Observation of Phase-Separated Structure by Transmission Electron Microscope (TEM) Tomography A sample piece of an electrolyte membrane was immersed in a 2 mass % aqueous lead acetate solution as a staining agent, and the sample piece was left standing at 25° C. for 48 hours for staining treatment. The stained sample was taken out, embedded in an epoxy resin, and fixed by irradiation with visible light for 30 seconds. A 100-nm thin piece was cut out using an ultramicrotome at room temperature, and the cut piece was observed according to the following conditions.

Device: Field Emission Electron Microscope (HRTEM) JEM-2100F manufactured by JEOL Ltd.
Image capturing: Digital Micrograph
System: marker method
Accelerating voltage: 200 kV
Magnification: 30,000 times
Tilt angle: +61° to −62°
Reconstruction resolution: 0.71 nm/pixel The marker method was applied to the three-dimensional reconstruction process. An alignment marker used for performing three-dimensional reconstruction was Au colloidal particles provided on a collodion film. Using the marker as a reference, the sample was tilted in 1° steps in the range of +61° to −62° and TEM images were taken. Based on a total of 124 TEM images in the obtained tilt-series TEM images, a CT reconstruction process was performed, and a three-dimensional phase-separated structure was observed.

(5) Measurement of Dimensional Change Rate ($\lambda_{xy}$) by Hot Water Test

An electrolyte membrane was cut into a square piece of about 5 cm×about 5 cm, left standing for 24 hours in a temperature- and humidity-controlled atmosphere having a temperature of 23° C.±5° C. and a humidity of 50%±5%, and then the MD length and the TD length (MD1 and TD1) were measured with a caliper. The electrolyte membrane was immersed in hot water at 80° C. for 8 hours, then the MD length and the TD length (MD2 and TD2) were measured again with a caliper, and the dimensional change rates of MD and TD in the plane direction ($\lambda_{MD}$ and $\lambda_{TD}$) and the dimensional change rate of the electrolyte membrane in the plane direction ($\lambda_{xy}$) (%) were calculated by the following formulae.

$\lambda_{MD}=(MD2-MD1)/MD1\times100$ $\lambda_{TD}=(TD2-TD1)/TD1\times100$ $\lambda_{xy}=(\lambda_{MD}+\lambda_{TD})/2$ (6) Production of Membrane Electrode Assembly (MEA) Using Electrolyte Membrane A pair of commercially available electrodes, that is, gas diffusion electrodes for fuel cells "ELAT® LT120ENSI" manufactured by BASF SE with 5 g/m² of Pt were each cut into a 5-cm square piece, and were stacked to face each other as a fuel electrode and an air electrode so as to sandwich an electrolyte membrane. Then, the resulting laminate was hot-pressed at 150° C. and 5 MPa for 3 minutes to produce a MEA for dry-wet cycle durability evaluation.

(7) Proton Conductivity

A membrane-like sample was immersed in pure water at 25° C. for 24 hours, and then held in a thermostat at 80° C. and a relative humidity of 25 to 95% for 30 minutes in each step, and the proton conductivity of the sample was measured by a constant potential AC impedance method. The measurement device used was an electrochemical measuring system (Solartron 1287 Electrochemical Interface and Solartron 1255B Frequency Response Analyzer) manufactured by Solartron Analytical. The constant potential impedance was measured by a two-probe method to determine the proton conductivity. The AC amplitude was 50 mV. The sample used was a membrane having a width of 10 mm and a length of 50 mm. A measurement jig was produced from a phenol resin, and was opened at the measurement part. Two platinum plates (thickness: 100 μm) were used as electrodes. The electrodes were arranged on the front and back sides of the sample membrane with a distance between the electrodes of 10 mm so as to be parallel to each other and orthogonal to the longitudinal direction of the sample membrane.

(8) Dry-Wet Cycle Durability

The MEA produced in the item (6) was set in a JARI standard cell "Ex-1" (electrode area: 25 cm²) manufactured by EIWA Corporation. At a cell temperature of 80° C., a cycle of supplying 160% RH nitrogen to both the electrodes for 2 minutes and then supplying 0% RH nitrogen (dew point: −20° C. or less) to both the electrodes for 2 minutes was repeated. The hydrogen permeation amount was measured at every 1,000 cycles, and the point at which the hydrogen permeation current exceeded 10 times the initial current was defined as the dry-wet cycle durability.

The hydrogen permeation amount was measured by supplying hydrogen as a fuel gas to one electrode and nitrogen to the other electrode, and conducting the test under humidification conditions of a 90% RH hydrogen gas and a 90% RH nitrogen gas. The MEA was held until the open circuit voltage reached 0.2 V or less, the voltage was swept from 0.2 to 0.7 V at 1 mV/sec, and the current value at 0.7 V was taken as the hydrogen permeation current.

(9) Cell Voltage

Platinum catalyst-supporting carbon particles TEC10E50E (platinum support rate: 50 mass %) manufactured by TANAKAKIKINZOKU KOGYO K.K. and "Nafion®" manufactured by E. I. du Pont de Nemours and Company were adjusted to a mass ratio of 2:1 to produce a catalyst ink. The catalyst ink was applied to a commercially available film made of polytetrafluoroethylene so that the amount of platinum might be 0.3 mg/cm² to produce a catalyst decal.

Two 5-cm square pieces were cut from the catalyst decal, and the cut pieces were stacked to face each other so as to sandwich an electrolyte membrane. Then, the resulting laminate was hot-pressed at 150° C. and 5 MPa for 3 minutes to produce a catalyst coated membrane. Using the obtained catalyst coated membrane, a MEA was produced with one surface serving as a cathode electrode and the other surface serving as an anode electrode.

The obtained MEA was set in a JARI standard cell "Ex-1" (electrode area: 25 cm²) manufactured by EIWA Corporation, and the current-voltage (I-V) was measured at a cell temperature of 90° C. using hydrogen as a fuel gas and the air as an oxidizing gas at a gas utilization rate of 70% for hydrogen and 40% for oxygen under humidification conditions of 30% RH on the anode side and 30% RH on the cathode side at a back pressure of 0.1 MPa (both the electrodes). The cell voltage at 1 A/cm² was read.

(10) Measurement of Fluorine Atom Content in Fluorine-Containing Polymer Porous Substrate A fluorine-containing polymer porous substrate sample was weighed and burned in a combustion tube of an analyzer according to the following conditions, the generated gas was made to be absorbed in a solution, and part of the liquid having absorbed the gas was analyzed by ion chromatography.

<Combustion/Absorption Conditions>

System: AQF-2100H and GA-210 (manufactured by Mitsubishi Chemical Corporation)

Temperature of electric furnace: 900° C. at the inlet and 1,000° C. at the outlet Gas: $Ar/O_2$ 200 mL/min, $O_2$ 400 mL/min Absorption liquid: $H_2O_2$ 0.1%, internal standard Br 8 μg/mL Volume of absorption liquid: 20 mL <Ion chromatography/anion analysis conditions>

System: ICS1600 (manufactured by DIONEX)

Mobile phase: 2.7 mmol/L $Na_2CO_3$/0.3 mmol/L $NaHCO_3$

Flow rate: 1.50 mL/min

Detector: electrical conductivity detector

Injection volume: 20 μL

(11) Chemical Structure Analysis of Surfactants

Chemical structures of various surfactants were analyzed by infrared spectroscopy (IR), $^1$H nuclear magnetic resonance (NMR) analysis, $^{19}$F NMR analysis, MALDI-MS analysis, and pyrolysis GC/MS analysis, and the contents of fluorine atoms and hydrophilic elements (total of oxygen, nitrogen, phosphorus, sulfur, and boron) were calculated.

(12) Measurement of Weight Average Molecular Weight of Surfactant

The weight average molecular weight of a surfactant was measured by gel permeation chromatography (GPC) analysis according to the following conditions.

Device: Gel Permeation Chromatograph GPC (Instrument No. GPC-27)

Detector: UV-visible absorption spectrophotometer UV (SPD-20AV manufactured by SHIMADZU CORPORATION)

Column: TSKgel SuperHZM-N (two pieces)

SuperHZ4000, 2500, and 1000 (each one piece)

Solvent: tetrahydrofuran (THF)

Flow rate: 0.45 mL/min

Column temperature: 40° C.

Injection volume: 0.02 mL

Standard sample: monodisperse polyethylene glycol (PEG) manufactured by Tosoh Corporation and Agilent Technologies Japan, Ltd.

Data processing: GPC data processing system manufactured by Toray Research Center, Inc.

(13) Cross-Sectional SEM Measurement of Composite Electrolyte Membrane

A composite electrolyte membrane was subjected to cross-sectional SEM measurement according to the following conditions. In the obtained image, the central white area was regarded as a composite layer, and the black areas neighboring the white area were regarded as other external layers, and the thicknesses of the layers were measured.

Device: Field Emission Scanning Electron Microscope (FE-SEM) S-4800 (manufactured by Hitachi High-Technologies Corporation)

Accelerating voltage: 2.0 kV

Pretreatment: A cross-sectional sample produced by the BIB method was coated with Pt and subjected to the measurement.

BIB method: A cross-sectional sample production device based on an argon ion beam. A shielding plate is placed directly on the sample, and the sample is irradiated with a broad ion beam of argon for etching to produce an observation surface/analysis surface (cross section).

(14) Amount of Surfactant Contained in Electrolyte Membrane

An electrolyte membrane was weighed and burned in a combustion tube of an analyzer according to the following conditions, the generated gas was made to be absorbed in a solution, and part of the liquid having absorbed the gas was analyzed by ion chromatography. In the case of an electrolyte membrane that does not include a porous substrate, the contribution of the surfactant was calculated by excluding, from the analysis value, the contribution of the polymer electrolyte that does not contain the surfactant measured in advance, the amount of the surfactant contained in the electrolyte membrane was calculated from the amount of fluorine atoms included in the surfactant, and the ratio of the surfactant to the polymer electrolyte contained in the electrolyte membrane (surfactant/polymer electrolyte) was determined. In the case of a composite electrolyte membrane, the contribution of the surfactant was calculated by excluding, from the analysis value, the contribution of the polymer electrolyte that does not contain the surfactant measured in advance and the contribution of the fluorine-containing polymer porous substrate measured in advance in the item (10), the amount of the surfactant contained in the composite electrolyte membrane was calculated from the amount of fluorine atoms included in the surfactant, and the ratio of the surfactant to the polymer electrolyte contained in the composite membrane (surfactant/polymer electrolyte) was determined.

<Combustion/Absorption Conditions>

System: AQF-2100H and GA-210 (manufactured by Mitsubishi Chemical Corporation)

Temperature of electric furnace: 900° C. at the inlet and 1,000° C. at the outlet Gas: $Ar/O_2$ 200 mL/min, $O_2$ 400 mL/min Absorption liquid: $H_2O_2$ 0.1%, internal standard Br 8 µg/mL Volume of absorption liquid: 20 mL <Ion Chromatography/Anion Analysis Conditions>

System: ICS1600 (manufactured by DIONEX)

Mobile phase: 2.7 mmol/L $Na_2CO_3$/0.3 mmol/L $NaHCO_3$

Flow rate: 1.50 mL/min

Detector: electrical conductivity detector

Injection volume: 20 µL

(15) Measurement of Oxygen Content of Porous Substrate by XPS

A porous substrate cut into a 5-mm square piece in advance was rinsed with ultrapure water, dried at room temperature at 67 Pa for 10 hours, cooled with liquid nitrogen for 30 minutes, and subjected to treatment with a freezer mill for 5 minutes twice to prepare a sample. The composition of the prepared sample was measured, and the oxygen atom content of the sample was calculated. The measurement device and conditions are as follows.

Measurement device: Quantera SXM

Excited X-ray: monochromatic Al K α1,2 ray (1486.6 eV)

X-ray diameter: 200 µm

Photoelectron take-off angle: 45°

Synthesis Example 1

(Synthesis of 2,2-bis(4-hydroxyphenyl)-1,3-dioxolane (K-DHBP) Represented by the Following General Formula (G1))

In a 500-mL flask equipped with a stirrer, a thermometer, and a distillation tube, 49.5 g of 4,4'-dihydroxybenzophenone, 134 g of ethylene glycol, 96.9 g of trimethyl orthoformate, and 0.50 g of p-toluenesulfonic acid monohydrate were charged and dissolved. Then, the contents were kept warm and stirred at 78 to 82° C. for 2 hours. Further, the internal temperature was gradually raised to 120° C., and the contents were heated until the distillation of methyl formate, methanol, and trimethyl orthoformate completely stopped. After the reaction liquid was cooled to room temperature, the reaction liquid was diluted with ethyl acetate, the organic layer was washed with 100 mL of a 5% aqueous potassium carbonate solution, the resulting liquid was separated, and the solvent was distilled away. To the residue, 80 mL of dichloromethane was added to deposit crystals, and the crystals were filtered and dried to give 52.0 g of 2,2-bis(4-hydroxyphenyl)-1,3-dioxolane. The crystals were analyzed by GC, and it was found that the crystals were 99.9% of 2,2-bis(4-hydroxyphenyl)-1,3-dioxolane and 0.1% of 4,4'-dihydroxybenzophenone.

[Chemical Formula 5]

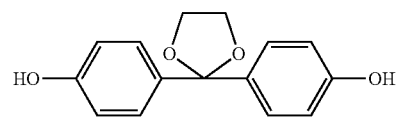

(G1)

Synthesis Example 2

(Synthesis of Disodium-3,3'-disulfonate-4,4'-difluorobenzophenone Represented by the Following General Formula (G2))

In 150 mL of fuming sulfuric acid (50% $SO_3$) (a Wako Pure Chemical reagent), 109.1 g of 4,4'-difluorobenzophenone (an Aldrich reagent) was reacted at 100° C. for 10 hours. Then, the resulting product was gradually poured into a large amount of water, the resulting mixture was neutralized with NaOH, and then 200 g of sodium chloride (NaCl) was added to the mixture to precipitate a synthesized product. The obtained precipitate was filtered off and recrystallized from an aqueous ethanol solution to give the disodium-3,3'-disulfonate-4,4'-difluorobenzophenone represented by the general formula (G2). The compound had a purity of 99.3%.

[Chemical Formula 6]

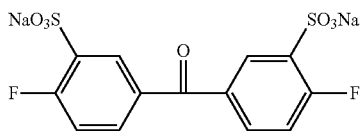

(G2)

Synthesis Example 3

(Synthesis of Ionic Group-Free Oligomer a1 Represented by the Following General Formula (G3))

In a 1000-mL three-necked flask equipped with a stirrer, a nitrogen introduction tube, and a Dean-Stark trap, 16.59 g of potassium carbonate (an Aldrich reagent, 120 mmol), 25.8 g (100 mmol) of K-DHBP obtained in Synthesis Example 1, and 20.3 g of 4,4'-difluorobenzophenone (an Aldrich reagent, 93 mmol) were added. After nitrogen substitution, the contents were dehydrated in 300 mL of N-methylpyrrolidone (NMP) and 100 mL of toluene at 160° C., the temperature was raised to remove toluene, and the contents were polymerized at 180° C. for 1 hour. The resulting product was subjected to reprecipitation purification in a large amount of methanol to produce an ionic group-free oligomer (terminal: hydroxyl group). The oligomer had a number average molecular weight of 10,000.

In a 500-mL three-necked flask equipped with a stirrer, a nitrogen introduction tube, and a Dean-Stark trap, 1.1 g of potassium carbonate (an Aldrich reagent, 8 mmol) and 20.0 g (2 mmol) of the ionic group-free oligomer (terminal: hydroxyl group) were added. After nitrogen substitution, the contents were dehydrated in 100 mL of N-methylpyrrolidone (NMP) and 30 mL of toluene at 100° C., the temperature was raised to remove toluene, 4.0 g of decafluorobiphenyl (an Aldrich reagent, 12 mmol) was added, and the contents were reacted at 105° C. for 1 hour. The resulting product was subjected to reprecipitation for purification in a large amount of isopropyl alcohol to produce an ionic group-free oligomer a1 (terminal: fluoro group) represented by the following formula (G3). The oligomer had a number average molecular weight of 11,000.

[Chemical Formula 7]

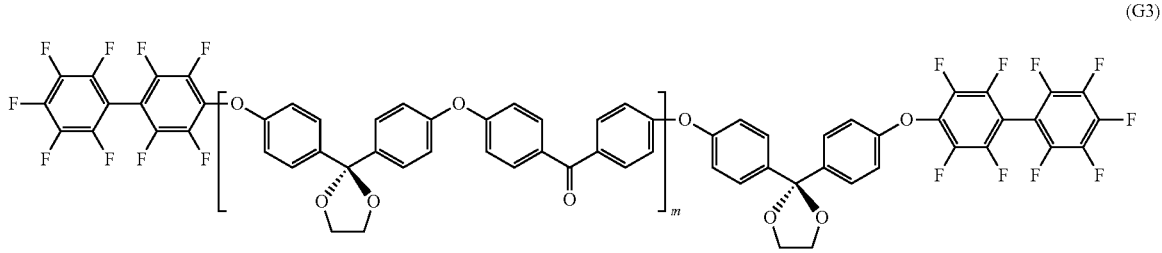

(G3)

Synthesis Example 4

(Synthesis of Ionic Group-Containing Oligomer a2 Represented by the Following General Formula (G4))

In a 1000-mL three-necked flask equipped with a stirrer, a nitrogen introduction tube, and a Dean-Stark trap, 27.6 g of potassium carbonate (an Aldrich reagent, 200 mmol), 12.9 g (50 mmol) of K-DHBP obtained in Synthesis Example 1, 9.3 g of 4,4'-biphenol (an Aldrich reagent, 50 mmol), 39.3 g (93 mmol) of disodium-3,3'-disulfonate-4,4'-difluorobenzophenone obtained in Synthesis Example 2, and 17.9 g of 18-crown-6 (Wako Pure Chemical Industries, Ltd., 82 mmol) were added. After nitrogen substitution, the contents were dehydrated in 300 mL of N-methylpyrrolidone (NMP) and 100 mL of toluene at 170° C., the temperature was raised to remove toluene, and the contents were polymerized at 180° C. for 1 hour. The resulting product was subjected to reprecipitation for purification in a large amount of isopropyl alcohol to produce an ionic group-containing oligomer a2 (terminal: hydroxyl group) represented by the following formula (G4). The oligomer had a number average molecular weight of 16,000.

[Chemical Formula 8]

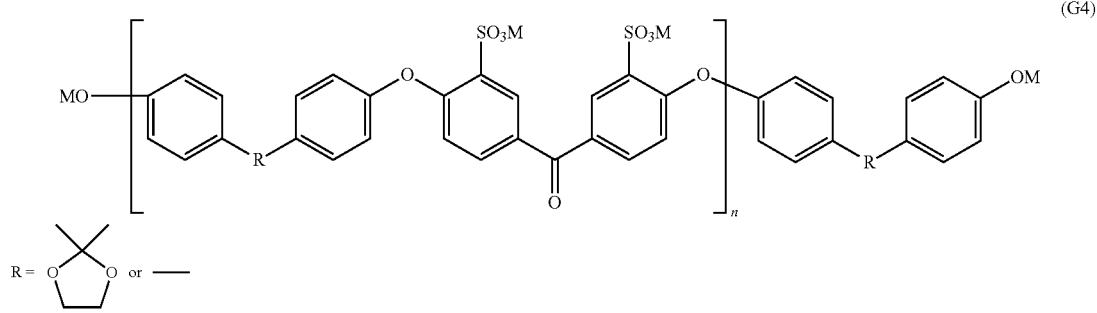

(In the formula (G4), M represents H, Na, or K.)

Synthesis Example 5

(Synthesis of Neopentyl 3-(2,5-dichlorobenzoyl)benzenesulfonate Represented by the Following Formula (G5))

To a 3-L three-necked flask equipped with a stirrer and a cooling tube, 245 g (2.1 mol) of chlorosulfonic acid was added, subsequently 105 g (420 mmol) of 2,5-dichlorobenzophenone was added, and the contents were reacted in an oil bath at 100° C. for 8 hours. After a predetermined time, the reaction liquid was slowly poured into 1,000 g of crushed ice and extracted with ethyl acetate. The organic layer was washed with brine and dried over magnesium sulfate, and then ethyl acetate was distilled away to give light yellow crude crystals of 3-(2,5-dichlorobenzoyl)benzenesulfonic acid chloride. The crude crystals were used in the next step as they were without purification.

To 300 mL of pyridine, 41.1 g (462 mmol) of 2,2-dimethyl-1-propanol (neopentyl alcohol) was added, and the resulting mixture was cooled to about 10° C. The crude crystals obtained as described above were gradually added to the mixture over about 30 minutes. After all the crude crystals were added, the mixture was stirred for another 30 minutes to react. After the reaction, the reaction liquid was poured into 1,000 mL of aqueous hydrochloric acid, and the deposited solid was collected. The obtained solid was dissolved in ethyl acetate, the resulting solution was washed with an aqueous sodium hydrogen carbonate solution and brine and dried over magnesium sulfate, and ethyl acetate was distilled away to give crude crystals. The crude crystals were recrystallized from methanol to give white crystals of neopentyl 3-(2,5-dichlorobenzoyl)benzenesulfonate represented by the structural formula.

Synthesis Example 6

(Synthesis of Ionic Group-Free Oligomer Represented by the Following General Formula (G6))

In a 1-L three-necked flask equipped with a stirrer, a thermometer, a cooling tube, a Dean-Stark tube, and a three-way cock for introducing nitrogen, 49.4 g (0.29 mol) of 2,6-dichlorobenzonitrile, 88.4 g (0.26 mol) of 2,2-bis(4-hydroxyphenyl)-1,1,1,3,3,3-hexafluoropropane, and 47.3 g (0.34 mol) of potassium carbonate were weighed. After nitrogen substitution, 346 mL of sulfolane and 173 mL of toluene were added to the contents, and the resulting mixture was stirred. The flask was placed in an oil bath and heated to 150° C. for reflux. The water generated by the reaction was azeotropically distilled with toluene, and the reaction was continued with the water being removed to the out of the system with the Dean-Stark tube. As a result, generation of water almost ceased to be observed in about 3 hours. Most of toluene was removed with the reaction temperature being gradually raised, and then the reaction was continued at 200° C. for 3 hours. Then, 12.3 g (0.072 mol) of 2,6-dichlorobenzonitrile was added, and the reaction was performed for another 5 hours.

The obtained reaction liquid was allowed to cool, and then 100 mL of toluene was added for dilution. The by-produced inorganic compound precipitate was removed by filtration, and the filtrate was poured into 2 L of methanol. The precipitated product was filtered off, collected, dried, and then dissolved in 250 mL of tetrahydrofuran. The resulting solution was reprecipitated in 2 L of methanol to give 107 g of a target oligomer represented by the following general formula (G6). The oligomer had a number average molecular weight of 11,000.

[Chemical Formula 9]

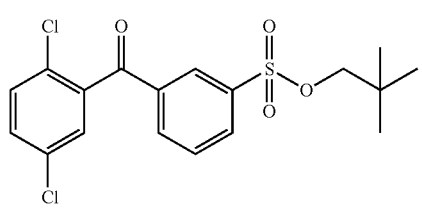

(G5)

[Chemical Formula 10]

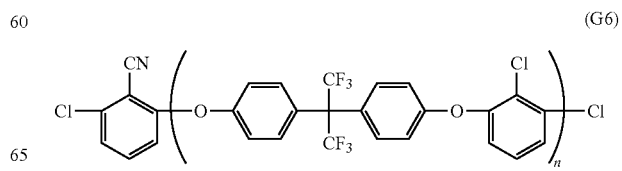

(G6)

Synthesis Example 7

(Synthesis of Polyether Sulfone (PES) Block Copolymer Precursor b2' Including Segment Represented by the Following Formula (G8) and Segment Represented by the Following Formula (G9))

First, 1.62 g of anhydrous nickel chloride and 15 mL of dimethyl sulfoxide were mixed, and the mixture was adjusted to 70° C. To the mixture, 2.15 g of 2,2'-bipyridyl was added, and the resulting mixture was stirred at the same temperature for 10 minutes to prepare a nickel-containing solution.

In 5 mL of dimethyl sulfoxide, 1.49 g of (2,2-dimethylpropyl)2,5-dichlorobenzenesulfonate and 0.50 g of SUMIKA EXCEL PES5200P (manufactured by SUMITOMO CHEMICAL COMPANY, LIMITED, Mn=40,000, Mw=94,000) represented by the following formula (G7) were dissolved, 1.23 g of a zinc powder was added to the resulting solution, and the resulting mixture was adjusted to 70° C. The nickel-containing solution was poured into the solution, and a polymerization reaction was performed at 70° C. for 4 hours. The reaction mixture was added to 60 mL of methanol, then 60 mL of 6 mol/L hydrochloric acid was added to the mixture, and the mixture was stirred for 1 hour. The deposited solid was separated by filtration and dried to give 1.62 g of an off-white block copolymer precursor b2' including the segments represented by the following formulae (G8) and (G9) in a yield of 99%. The block copolymer precursor had a weight average molecular weight of 230,000.

[Chemical Formula 11]

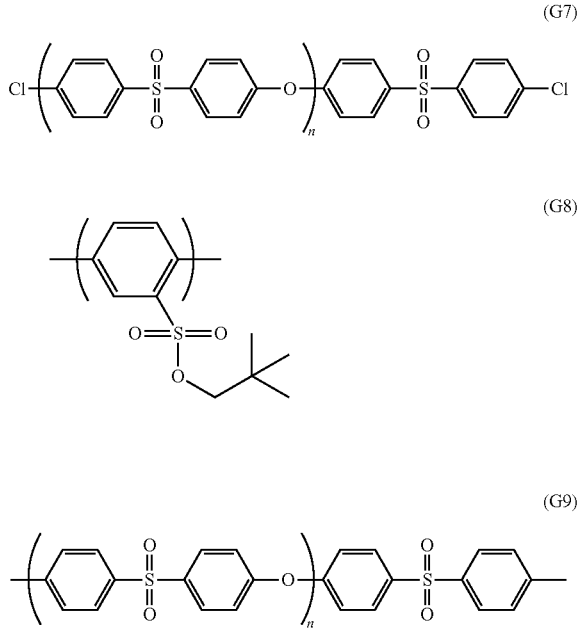

[Polymer Electrolyte Solution A] Polymer Electrolyte Solution Containing Block Copolymer Containing Oligomer Represented by the Formula (G4) as Ionic Group-Containing Segment, and Oligomer Represented by the Formula (G3) as Ionic Group-Free Segment In a 500-mL three-necked flask equipped with a stirrer, a nitrogen introduction tube, and a Dean-Stark trap, 0.56 g of potassium carbonate (an Aldrich reagent, 4 mmol) and 16 g (1=1) of the ionic group-containing oligomer a2 (terminal: hydroxyl group) obtained in Synthesis Example 4 were added. After nitrogen substitution, the contents were dehydrated in 100 mL of N-methylpyrrolidone (NMP) and 30 mL of cyclohexane at 100° C., the temperature was raised to remove cyclohexane, 11 g (1 mmol) of the ionic group-free oligomer a1 (terminal: fluoro group) obtained in Synthesis Example 3 was added, and the contents were reacted at 105° C. for 24 hours. The resulting product was subjected to reprecipitation purification in a large amount of isopropyl alcohol to produce a block copolymer b1. The block copolymer had a weight average molecular weight of 340,000.

A 5 mass % N-methylpyrrolidone (NMP) solution in which the obtained block copolymer was dissolved, that is, a polymerization stock solution was directly centrifuged with an inverter/compact high speed refrigerated centrifuge (model number 6930 with angle rotor RA-800, 25° C., 30 minutes, centrifugal force: 20,000 G) manufactured by KUBOTA Corporation Co., Ltd. Since the sedimented solid matter (cake) and the supernatant liquid (coating liquid) were neatly separated, the supernatant liquid was collected. Then, the liquid was distilled under reduced pressure at 80° C. with stirring, and pressure-filtered using a 1 μm polypropylene filter to give a polymer electrolyte solution A (polymer electrolyte concentration: 13 mass %). The polymer electrolyte solution A had a viscosity of 1,300 mPa·s.

[Polymer Electrolyte Solution B] Polymer Electrolyte Solution Containing Polyarylene Block Copolymer Represented by the Following General Formula (G10)

To a mixture of 135.0 g (0.336 mol) of neopentyl 3-(2,5-dichlorobenzoyl)benzenesulfonate, 40.7 g (5.6 mmol) of the ionic group-free oligomer represented by the formula (G6) and synthesized in Synthesis Example 6, 6.71 g (16.8 mmol) of 2,5-dichloro-4'-(1-imidazolyl)benzophenone, 6.71 g (10.3 mmol) of bis(triphenylphosphine)nickel dichloride, 35.9 g (0.137 mol) of triphenylphosphine, 1.54 g (10.3 mmol) of sodium iodide, and 53.7 g (0.821 mol) of zinc, 540 mL of dried N,N-dimethylacetamide (DMAc) was added under nitrogen.

The reaction system was heated (finally warmed to 79° C.) with stirring and reacted for 3 hours. An increase in the viscosity of the system was observed during the reaction. The polymerization reaction solution was diluted with 730 mL of DMAc, stirred for 30 minutes, and filtered using Celite as a filter aid.

The filtrate was concentrated with an evaporator, 43.8 g (0.505 mol) of lithium bromide was added to the filtrate, and the resulting mixture was reacted at an internal temperature of 110° C. for 7 hours in a nitrogen atmosphere. After the reaction, the mixture was cooled to room temperature, poured into 4 L of acetone, and solidified. The solidified product was collected by filtration, air-dried, pulverized with a mixer, and washed with 1,500 mL of 1 N hydrochloric acid with stirring. After filtration, the product was washed with ion-exchanged water until the washing liquid came to have a pH of 5 or more, and then dried at 80° C. overnight to give 23.0 g of a target polyarylene block copolymer. The polyarylene block copolymer had a weight average molecular weight of 190,000 after the deprotection. The obtained polyarylene block copolymer was dissolved in an N-methyl-2-pyrrolidone/methanol=30/70 (mass %) organic solvent so that the resulting solution might have a concentration of 0.1 g/g to give a polymer electrolyte solution B. The polymer electrolyte solution B had a viscosity of 1,200 mPa·s.

[Chemical Formula 12]

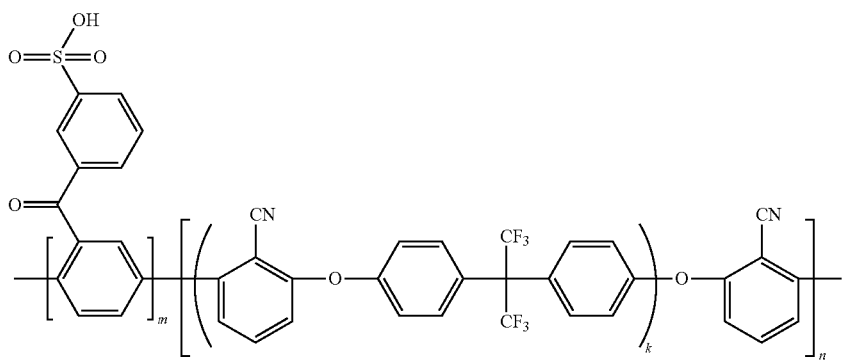

(G10)

[Polymer Electrolyte Solution C] Polymer Electrolyte Solution C Containing Random Copolymer In a 5-L reaction vessel equipped with a stirrer, a nitrogen introduction tube, and a Dean-Stark trap, 129 g of 2,2-bis(4-hydroxyphenyl)-1,3-dioxolane synthesized in Synthesis Example 1, 93 g of 4,4'-biphenol (an Aldrich reagent), and 422 g (1.0 mol) of disodium-3,3'-disulfonate-4,4'-difluorobenzophenone synthesized in Synthesis Example 2 were added. After nitrogen substitution, 3,000 g of N-methyl-2-pyrrolidone (NMP), 450 g of toluene, and 232 g of 18-crown-6 (a Wako Pure Chemical reagent) were added. After it was confirmed that all the monomers were dissolved, 304 g of potassium carbonate (an Aldrich reagent) was added to the solution, and the solution was dehydrated at 160° C. with refluxing, then the temperature was raised to remove toluene, and desalting polycondensation was performed at 200° C. for 1 hour. The resulting product had a weight average molecular weight of 320,000.

Then, the polymerization stock solution was diluted by the addition of NMP so that the solution might have a viscosity of 500 mPa·s, and was directly centrifuged with an inverter/compact high speed refrigerated centrifuge (model number 6930 with angle rotor RA-800, 25° C., 30 minutes, centrifugal force: 20,000 G) manufactured by KUBOTA Corporation Co., Ltd. Since the sedimented solid matter (cake) and the supernatant liquid (coating liquid) were neatly separated, the supernatant liquid was collected. Then, the liquid was distilled under reduced pressure at 80° C. with stirring to remove NMP until the polymer concentration reached 14 mass %, and pressure-filtered using a 5 μm polyethylene filter to give a polymer electrolyte solution C. The polymer electrolyte solution C had a viscosity of 1,000 mPa·s.

[Polymer Electrolyte Solution D] Polymer Electrolyte Solution D Containing Polyether Sulfone Block Copolymer To a mixed solution of 0.16 g of lithium bromide monohydrate and 8 mL of NMP, 0.23 g of the block copolymer precursor b2' obtained in Synthesis Example 7 was added, and the mixture was reacted at 120° C. for 24 hours. The reaction mixture was poured into 80 mL of 6 mol/L hydrochloric acid and stirred for 1 hour. The deposited solid was separated by filtration. The separated solid was dried to give an off-white block copolymer b2 including the segment represented by the following formula (G9) and a segment represented by the following formula (G11). The obtained polyether sulfone block copolymer had a weight average molecular weight of 190,000. The obtained polyether sulfone block copolymer was dissolved in an N-methyl-2-pyrrolidone/methanol=30/70 (mass %) organic solvent so that the resulting solution might have a concentration of 0.1 g/g to give a polymer electrolyte solution D. The polymer electrolyte solution D had a viscosity of 1,300 mPa·s.

[Chemical Formula 13]

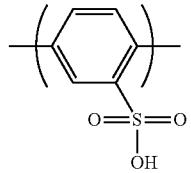

(G11)

[Polytetrafluoroethylene (ePTFE) porous substrate A]

Poreflon HP-045-30 (manufactured by Sumitomo Electric Fine Polymer, Inc.) was stretched three times in the longitudinal and transverse directions to produce an ePTFE porous film A having a film thickness of 8 μm and a porosity of 89%.

[Hydrophilized ePTFE porous substrate A']

In a glove box having a dew point of −80° C., the ePTFE porous substrate A was immersed in a solution of 30 g of a 1% metal sodium-naphthalene complex/tetrahydrofuran (THF) solution and 70 g of THF, pulled up after 3 seconds, and immediately thoroughly washed with THF to produce a hydrophilized ePTFE porous substrate A' having a film thickness of 8 μm and a porosity of 88%.

[Tetrafluoroethylene-Hexafluoropropylene Copolymer (FEP) Porous Substrate B]

In a powder mixer, 75 parts by weight of a FEP copolymer resin (manufactured by FRON INDUSTRY) and 15 parts by weight of silica fine particles (QSG-30 manufactured by Shin-Etsu Chemical Co., Ltd., average primary particle diameter: 30 nm) as an inorganic filler were mixed well.

The mixture was kneaded using a twin-screw extruder (TEM-35 manufactured by Toshiba Machine Co., Ltd.) at 300° C., then extruded into a strand having a diameter of 2.5 mm, and the strand was cut into a length of 2.5 mm to produce a pellet.

The pellet was supplied to a single-screw extruder having a diameter of 40 mm (VS40 manufactured by Ikegai Corp.), and extruded at a die temperature of 333° C. and an extrusion speed of 4.3 kg/h using a flat die having a cap width of 700 mm. The discharged product was taken up on a roll adjusted to have a surface temperature of 130° C. at a speed of 4.8 m/min to give an ETFE film having a thickness of 13 μm.

The obtained film was stretched four times in the longitudinal and transverse directions to produce a FEP porous substrate B having a film thickness of 8 μm and a porosity of 90%.

[Polyvinylidene Difluoride (PVdF) Porous Substrate C]

A Durapore membrane (manufactured by Merck Millipore, hydrophobic, pore size: 0.45 μm, diameter: 293 mm, white, plain) was stretched three times in the longitudinal and transverse directions to produce a PVdF porous substrate C having a film thickness of 8 μm and a porosity of 88%.

[Ethylene-Tetrafluoroethylene Copolymer (ETFE) Porous Substrate D]

An ETFE porous substrate D having a film thickness of 8 μm and a porosity of 89% was produced in the same manner as for the FEP porous substrate B except that an ETFE resin (manufactured by Sigma-Aldrich) was used instead of the FEP resin (manufactured by FRON INDUSTRY).

<Production of Electrolyte Membrane Including No Porous Substrate>

Example 1-1

In 100 g of the polymer electrolyte solution A, 0.26 g of a polyoxyethylene ether surfactant Ftergent® FTX-218 (manufactured by NEOS COMPANY LIMITED) (fluorine atom content: 46 mass %, hydrophilic element content: 14 mass %, weight average molecular weight: 1,900) was dissolved to prepare an electrolyte-surfactant mixed solution having a mass ratio of the polymer electrolyte to the surfactant (hereinafter referred to as "surfactant/electrolyte") of 0.02. The electrolyte-surfactant mixed solution was applied to a polyethylene terephthalate (PET) substrate by cast coating, dried at 100° C. for 4 hours, and then heat-treated under nitrogen at 150° C. for 10 minutes. After being immersed in a 10 mass % aqueous sulfuric acid solution at 95° C. for 24 hours for proton exchange and a deprotection reaction, the substrate was immersed in a large excess amount of pure water for 24 hours and thoroughly washed to give an electrolyte membrane (film thickness: 10 μm).

Example 1-2

An electrolyte membrane (film thickness: 10 μm) was obtained in the same manner as in Example 1-1 except that a fluorine group-containing hydrophilic group/lipophilic group-containing oligomer surfactant Ftergent® 710FS (manufactured by NEOS COMPANY LIMITED) (fluorine atom content: 16 mass %, hydrophilic element content: 30 mass %, weight average molecular weight: 3,500) was used instead of Ftergent FTX-218, and the surfactant/electrolyte of the solution was changed to 0.04.

Example 1-3

An electrolyte membrane (film thickness: 10 μm) was obtained in the same manner as in Example 1-1 except that a polyoxyethylene ether surfactant Ftergent® 215M (manufactured by NEOS COMPANY LIMITED) (fluorine atom content: 26 mass %, hydrophilic element content: 24 mass %, weight average molecular weight: 1,050) was used instead of Ftergent FTX-218, and the surfactant/electrolyte of the solution was changed to 0.04.

Example 1-4

An electrolyte membrane (film thickness: 10 μm) was obtained in the same manner as in Example 1-1 except that a polyoxyethylene ether surfactant Ftergent® 208G (manufactured by NEOS COMPANY LIMITED) (fluorine atom content: 54 mass %, hydrophilic element content: 11 mass %, weight average molecular weight: 1,400) was used instead of Ftergent FTX-218, and the surfactant/electrolyte of the solution was changed to 0.01.

Example 1-5

An electrolyte membrane (film thickness: 10 μm) was obtained in the same manner as in Example 1-1 except that a surfactant having a lipophilic group as a lyophilic group, that is, Fluorolink® A10-P (manufactured by Solvay Specialty Polymers Japan K.K.) (fluorine atom content: 40 mass %, weight average molecular weight: 1,900) was used instead of Ftergent FTX-218.

Example 1-6

An electrolyte membrane (film thickness: 10 μm) was obtained in the same manner as in Example 1-1 except that the surfactant/polymer electrolyte mass ratio was changed to 0.005.

Example 1-7

An electrolyte membrane (film thickness: 10 μm) was obtained in the same manner as in Example 1-1 except that the surfactant/polymer electrolyte was changed to 0.045.

Example 1-8

An electrolyte membrane (film thickness: 10 μm) was obtained in the same manner as in Example 1-1 except that a low metal content grade polyoxyethylene ether surfactant Ftergent® DFX-18 (manufactured by NEOS COMPANY LIMITED) (fluorine atom content: 46 mass %, hydrophilic element content: 14 mass %, weight average molecular weight: 1,900) was used instead of Ftergent FTX-218.

Comparative Example 1-1

An electrolyte membrane (film thickness: 10 μm) was obtained in the same manner as in Example 1-1 except that a surfactant Triton X-100 (a non-fluorinated surfactant) (fluorine atom content: 0, hydrophilic element content: 27 mass %, weight average molecular weight: 700) was used instead of Ftergent FTX-218.

Comparative Example 1-2

An electrolyte membrane (film thickness: 10 μm) was obtained in the same manner as in Example 1-1 except that a fluoropolymer A (fluorine atom content: 37 mass %, hydrophilic element content: 16 mass %, weight average molecular weight: 60,000) produced by charging monomers of hexafluoropropylene, perfluoro(propyl vinyl ether), ethyl vinyl ether, and hydroxyethyl vinyl ether at a molar ratio of 35:15:25:25 was used instead of Ftergent FTX-218.

Comparative Example 1-3

An electrolyte membrane (film thickness: 10 μm) was obtained in the same manner as in Example 1-1 except that a surfactant perfluorooctanesulfonic acid (PFOS) (anionic fluorosurfactant) (fluorine atom content: 65 mass %, hydrophilic element content: 16 mass %, weight average molecular weight: 500) was used instead of Ftergent FTX-218.

Comparative Example 1-4

A catalyst coated membrane was obtained in the same manner as in Example 1-1 except that the polymer electrolyte solution A was used as it was without the addition of a nonionic fluorine additive.

The electrolyte membranes produced in Examples 1-1 to 1-8 and Comparative Examples 1-1 to 1-4 were evaluated for the ion exchange capacity (IEC), surfactant/electrolyte value in the electrolyte membrane, mode of the phase-separated structure, proton conductivity, and cell voltage. The evaluation results are shown in Table 1. (Although the fluoropolymer A used in Comparative Example 1-2 does not generally correspond to the "surfactant", the fluoropolymer is shown in the column of "Surfactant" in Table 1 for convenience.)

immersed in a 10 mass % aqueous sulfuric acid solution at 80° C. for 24 hours for proton exchange and a deprotection reaction, the polymer was immersed in a large excess amount of pure water for 24 hours and thoroughly washed to give a composite electrolyte membrane (film thickness: 11 μm).

Example 2-2

A composite electrolyte membrane (film thickness: 12 μm) was obtained in the same manner as in Example 2-1 except that an electrolyte-surfactant mixed solution having a surfactant/electrolyte of 0.10 was used.

Example 2-3

A composite electrolyte membrane (film thickness: 12 μm) was obtained in the same manner as in Example 2-1 except that an electrolyte-surfactant mixed solution having a surfactant/electrolyte of 0.01 was used.

TABLE 1

| | Mixed solution | | | Electrolyte membrane | | | | |
|---|---|---|---|---|---|---|---|---|
| | | | Surfactant/ polymer electrolyte (mass ratio) | | Surfactant/polymer electrolyte (mass ratio) (measured value) | Mode of phase-separated structure | Proton conductivity (mS/cm) | Cell voltage (V) |
| | Polymer electrolyte solution | Surfactant | | IEC (meq/g) | | | | |
| Example 1-1 | A | Ftergent FTX-218 | 0.02 | 2.09 | 0.02 | Co-continuous | 2.8 | 0.562 |
| Example 1-2 | A | Ftergent 710FS | 0.04 | 2.04 | 0.038 | Co-continuous | 2.7 | 0.552 |
| Example 1-3 | A | Ftergent 215M | 0.04 | 2.05 | 0.039 | Co-continuous | 2.7 | 0.555 |
| Example 1-4 | A | Ftergent 208G | 0.01 | 2.11 | 0.01 | Co-continuous | 2.8 | 0.569 |
| Example 1-5 | A | Fluorolink A10-P | 0.02 | 2.08 | 0.019 | Co-continuous | 2.8 | 0.558 |
| Example 1-6 | A | Ftergent FTX-218 | 0.005 | 2.12 | 0.005 | Co-continuous | 2.9 | 0.572 |
| Example 1-7 | A | Ftergent FTX-218 | 0.045 | 2.03 | 0.043 | Co-continuous | 2.7 | 0.554 |
| Example 1-8 | A | Ftergent DFX-18 | 0.02 | 2.09 | 0.02 | Co-continuous | 2.8 | 0.565 |
| Comparative Example 1-1 | A | Triton X-100 | 0.02 | 2.08 | 0.018 | Co-continuous | 2.8 | 0.489 |
| Comparative Example 1-2 | A | Fluoropolymer A | 0.02 | 2.07 | 0.02 | Sea-Island | 2.7 | 0.479 |
| Comparative Example 1-3 | A | PFOS | 0.02 | 2.09 | 0 | Co-continuous | 2.9 | 0.503 |
| Comparative Example 1-4 | A | — | — | 2.13 | — | Co-continuous | 2.9 | 0.508 |

<Production of Composite Electrolyte Membrane According to First Aspect>

Example 2-1

In 100 g of the polymer electrolyte solution A, 0.26 g of Ftergent FTX-218 was dissolved to prepare an electrolyte-surfactant mixed solution having a mass ratio of the polymer electrolyte to the surfactant (hereinafter referred to as "surfactant/electrolyte") of 0.02. The electrolyte-surfactant mixed solution was applied to a glass substrate by cast coating using a knife coater, and the ePTFE porous substrate A was bonded to the glass substrate. The resulting laminate was held at room temperature for 1 hour to sufficiently impregnate the ePTFE porous substrate A with the electrolyte-surfactant mixed solution A, and then the laminate was dried at 100° C. for 4 hours. The electrolyte-surfactant mixed solution A was applied again to the upper surface of the dried membrane by cast coating, and the laminate was held at room temperature for 1 hour and then dried at 100° C. for 4 hours to produce a film-like polymer. After being Example 2-4

A composite electrolyte membrane (film thickness: 12 μm) was obtained in the same manner as in Example 2-1 except that Ftergent 710FS was used instead of Ftergent FTX-218.

Example 2-5

A composite electrolyte membrane (film thickness: 12 μm) was obtained in the same manner as in Example 2-1 except that the polymer electrolyte solution B was used instead of the polymer electrolyte solution A.

Example 2-6

A composite electrolyte membrane (film thickness: 12 μm) was obtained in the same manner as in Example 2-1 except that the polymer electrolyte solution C was used instead of the polymer electrolyte solution A.

Example 2-7

A composite electrolyte membrane (film thickness: 12 μm) was obtained in the same manner as in Example 2-1 except that the polymer electrolyte solution D was used instead of the polymer electrolyte solution A.

Example 2-8

A composite electrolyte membrane (film thickness: 12 μm) was obtained in the same manner as in Example 2-1 except that a commercially available 10 mass % Nafion dispersion liquid (manufactured by Aidrich, Available Acid Capacity: 0.92 meq/g) (hereinafter referred to as a "polymer electrolyte solution E") was used instead of the polymer electrolyte solution A.

Example 2-9

A composite electrolyte membrane (film thickness: 12 μm) was obtained in the same manner as in Example 2-1 except that the FEP porous substrate B was used instead of the ePTFE porous substrate A.

Example 2-10

A composite electrolyte membrane (film thickness: 12 μm) was obtained in the same manner as in Example 2-1 except that the PVdF porous substrate C was used instead of the ePTFE porous substrate A.

Example 2-11

A composite electrolyte membrane (film thickness: 12 μm) was obtained in the same manner as in Example 2-1 except that the ETFE porous substrate D was used instead of the ePTFE porous substrate A.

Example 2-12

A composite electrolyte membrane (film thickness: 12 μm) was obtained in the same manner as in Example 2-1 except that Ftergent DFX-18 was used instead of Ftergent FTX-218.

Example 2-13

A composite electrolyte membrane (film thickness: 12 μm) was obtained in the same manner as in Example 2-1 except that Ftergent 208G was used instead of Ftergent FTX-218.

Comparative Example 2-1

An attempt was made to produce a composite electrolyte membrane in the same manner as in Example 2-1 except that the polymer electrolyte solution A was used instead of the electrolyte-surfactant mixed solution, but the polymer electrolyte solution A did not penetrate into the tetrafluoroethylene porous substrate A, and no composite electrolyte membrane was obtained.

Comparative Example 2-2

An attempt was made to produce a composite electrolyte membrane in the same manner as in Example 2-1 except that Triton X-100 was used instead of Ftergent FTX-218, but the polymer electrolyte solution A did not penetrate into the porous substrate, and no composite electrolyte membrane was obtained.

Comparative Example 2-3

A composite electrolyte membrane (film thickness: 12 μm) was obtained in the same manner as in Example 2-1 except that PFOS was used instead of Ftergent FTX-218.

Comparative Example 2-4

A composite electrolyte membrane (film thickness: 12 μm) was obtained in the same manner as in Example 2-1 except that the same fluoropolymer A as in Comparative Example 1-2 was used instead of Ftergent FTX-218.

Comparative Example 2-5

A composite electrolyte membrane (film thickness: 12 μm) was obtained in the same manner as in Comparative Example 2-1 except that the polymer electrolyte solution B was used instead of the polymer electrolyte solution A.

Comparative Example 2-6

An attempt was made to produce a composite electrolyte membrane in the same manner as in Comparative Example 2-1 except that the polymer electrolyte solution C was used instead of the polymer electrolyte solution A, but the polymer electrolyte solution A did not penetrate into the tetrafluoroethylene porous substrate A, and no composite electrolyte membrane was obtained.

Comparative Example 2-7

An attempt was made to produce a composite electrolyte membrane in the same manner as in Comparative Example 2-1 except that the polymer electrolyte solution D was used instead of the polymer electrolyte solution A, but the polymer electrolyte solution A did not penetrate into the porous substrate, and no composite electrolyte membrane was obtained.

Comparative Example 2-8

A composite electrolyte membrane (film thickness: 12 μm) was obtained in the same manner as in Comparative Example 2-1 except that the polymer electrolyte solution E was used instead of the polymer electrolyte solution A.

<Production of Composite Electrolyte Membrane According to Second Aspect>

Example 3-1

In 99 g of isopropyl alcohol, 1 g of Ftergent FTX-218 was dissolved to prepare a 1 mass % FTX-218 solution. Then, the FTX-218 solution was applied to an ePTFE porous substrate fixed to a glass substrate by cast coating using a knife coater, and dried at 100° C. for 1 hour to produce a surfactant-containing porous substrate A.

The polymer electrolyte solution A was applied to another glass substrate by cast coating using a knife coater, and the surfactant-containing porous substrate A separated from the foregoing glass substrate was bonded to the glass substrate. The resulting laminate was held at room temperature for 1 hour to sufficiently impregnate the surfactant-containing porous substrate A with the electrolyte-surfactant mixed solution A, and then the laminate was dried at 100° C. for 4 hours. The polymer electrolyte solution A was applied again to the upper surface of the dried membrane by cast coating, and the laminate was held at room temperature for 1 hour and then dried at 100° C. for 4 hours to produce a film-like polymer. After being immersed in a 10 mass % aqueous sulfuric acid solution at 80° C. for 24 hours for proton exchange and a deprotection reaction, the polymer was immersed in a large excess amount of pure water for 24 hours and thoroughly washed to give a composite electrolyte membrane (film thickness: 11 μm).

Example 3-2

A composite electrolyte membrane (film thickness: 12 μm) was obtained in the same manner as in Example 3-1 except that a 2 mass % 710FS solution prepared using Ftergent 710FS instead of Ftergent FTX-218 was used.

Comparative Example 3-1

An attempt was made to produce a composite electrolyte membrane in the same manner as in Example 2-1 except that Triton X-100 was used instead of Ftergent FTX-218, but the polymer electrolyte solution A did not penetrate into the ePTFE porous substrate A, and no composite electrolyte membrane was obtained.

Comparative Example 3-2

A composite electrolyte membrane (film thickness: 12 μm) was obtained in the same manner as in Example 3-1 except that PFOS was used instead of Ftergent FTX-218.

Comparative Example 3-3

A composite electrolyte membrane (film thickness: 12 μm) was obtained in the same manner as in Example 3-1 except that the same fluoropolymer A as in Comparative Example 1-2 was used instead of Ftergent FTX-218.

Comparative Example 3-4

A composite electrolyte membrane (film thickness: 13 μm) was obtained in the same manner as in Comparative Example 3-1 except that the hydrophilized ePTFE porous substrate A' was used instead of the ePTFE porous substrate A, and that Triton X-100 was not used.

The composite electrolyte membranes produced in Examples 2-1 to 2-13, Comparative Examples 2-1 to 2-8, Examples 3-1 to 3-2, and Comparative Examples 3-1 to 3-4 were evaluated for the ion exchange capacity (IEC), filling rate of the polymer electrolyte in the composite layer, dimensional change rate $\lambda_{xy}$, proton conductivity, and dry-wet cycle durability. In addition, the ionic group-containing polymer film that constitutes the composite electrolyte membrane was evaluated for the presence or absence of a phase-separated structure, and the fluorine-containing polymer porous substrate that constitutes the composite electrolyte membrane was evaluated for the fluorine atom content and the porosity. The evaluation results are shown in Tables 2-1, 2-2, and 3. (Although the fluoropolymer used in Comparative Examples 2-4 and 3-3 does not generally correspond to the "surfactant", the fluoropolymer is shown in the column of "Surfactant" in Tables 2-1, 2-2, and 3 for convenience. Moreover, as for the dry-wet cycle durability, when the hydrogen permeation current did not exceed 10 times the initial current even after 30,000 cycles, the evaluation was terminated at 30,000 cycles.)

TABLE 2-1-1

| | Impregnating solution | | | Porous substrate | | |
|---|---|---|---|---|---|---|
| | Polymer electrolyte solution | Surfactant | Surfactant/ polymer electrolyte (mass ratio) | Material | Fluorine atom content (%) | Oxygen atom content (%) | Porosity (%) |
| Example 2-1 | A | Ftergent FTX-218 | 0.02 | ePTFE | 76 | 0 | 89 |
| Example 2-2 | A | Ftergent FTX-218 | 0.10 | ePTFE | 76 | 0 | 89 |
| Example 2-3 | A | Ftergent FTX-218 | 0.01 | ePTFE | 76 | 0 | 89 |
| Example 2-4 | A | Ftergent 710FS | 0.02 | ePTFE | 76 | 0 | 89 |
| Example 2-5 | B | Ftergent FTX-218 | 0.02 | ePTFE | 76 | 0 | 89 |
| Example 2-6 | C | Ftergent FTX-218 | 0.02 | ePTFE | 76 | 0 | 89 |
| Example 2-7 | D | Ftergent FTX-218 | 0.02 | ePTFE | 76 | 0 | 89 |
| Example 2-8 | E | Ftergent FTX-218 | 0.02 | ePTFE | 76 | 0 | 89 |
| Example 2-9 | A | Ftergent FTX-218 | 0.02 | FEP | 76 | 7.8 | 90 |
| Example 2-10 | A | Ftergent FTX-218 | 0.02 | PVdF | 59 | 0 | 88 |
| Example 2-11 | A | Ftergent FTX-218 | 0.02 | ETFE | 59 | 7.8 | 89 |
| Example 2-12 | A | Ftergent DFX-18 | 0.02 | ePTFE | 76 | 0 | 89 |
| Example 2-13 | A | Ftergent 208G | 0.02 | ePTFE | 76 | 0 | 89 |

TABLE 2-1-2

| | Composite electrolyte membrane | | | | | | |
|---|---|---|---|---|---|---|---|
| | IEC (meq/g) | Filling rate in composite layer (%) | Surfactant/polymer electrolyte (mass ratio) (measured value) | Mode of phase-separated structure | Dimensional change rate $\lambda_{xy}$ (%) | Proton conductivity (mS/cm) | Dry-wet cycle durability (times) |
| Example 2-1 | 1.86 | 87 | 0.02 | Co-continuous | 4 | 2.7 | >30000 |
| Example 2-2 | 1.70 | 88 | 0.098 | Co-continuous | 4 | 2.5 | >30000 |
| Example 2-3 | 1.87 | 85 | 0.01 | Co-continuous | 5 | 2.8 | >30000 |

TABLE 2-1-2-continued

| | Composite electrolyte membrane | | | | | | |
|---|---|---|---|---|---|---|---|
| | IEC (meq/g) | Filling rate in composite layer (%) | Surfactant/polymer electrolyte (mass ratio) (measured value) | Mode of phase-separated structure | Dimensional change rate $\lambda_{xy}$ (%) | Proton conductivity (mS/cm) | Dry-wet cycle durability (times) |
| Example 2-4 | 1.85 | 85 | 0.019 | Co-continuous | 4 | 2.6 | >30000 |
| Example 2-5 | 1.65 | 87 | 0.02 | Lamellar | 7 | 0.9 | >30000 |
| Example 2-6 | 1.77 | 87 | 0.02 | None | 8 | 0.6 | 18000 |
| Example 2-7 | 1.57 | 86 | 0.019 | Co-continuous | 5 | 0.8 | >30000 |
| Example 2-8 | 0.84 | 87 | 0.02 | None | 6 | 2.3 | >30000 |
| Example 2-9 | 1.85 | 87 | 0.02 | Co-continuous | 5 | 2.7 | >30000 |
| Example 2-10 | 1.87 | 86 | 0.019 | Co-continuous | 8 | 2.6 | 28000 |
| Example 2-11 | 1.86 | 87 | 0.019 | Co-continuous | 7 | 2.7 | 25000 |
| Example 2-12 | 1.87 | 87 | 0.02 | Co-continuous | 4 | 2.7 | >30000 |
| Example 2-13 | 1.89 | 88 | 0.02 | Co-continuous | 4 | 2.8 | >30000 |

TABLE 2-2-1

| | Impregnating solution | | | Porous substrate | | | |
|---|---|---|---|---|---|---|---|
| | Polymer electrolyte solution | Surfactant | Surfactant/polymer electrolyte (mass ratio) | Material | Fluorine atom content (%) | Oxygen atom content (%) | Porosity (%) |
| Comparative Example 2-1 | A | — | — | ePTFE | 76 | 0 | 89 |
| Comparative Example 2-2 | A | Triton X-100 | 0.02 | ePTFE | 76 | 0 | 89 |
| Comparative Example 2-3 | A | PFOS | 0.02 | ePTFE | 76 | 0 | 89 |
| Comparative Example 2-4 | A | Fluoropolymer A | 0.02 | ePTFE | 76 | 0 | 89 |
| Comparative Example 2-5 | B | — | — | ePTFE | 76 | 0 | 89 |
| Comparative Example 2-6 | C | — | — | ePTFE | 76 | 0 | 89 |
| Comparative Example 2-7 | D | — | — | ePTFE | 76 | 0 | 89 |
| Comparative Example 2-8 | E | — | — | ePTFE | 76 | 0 | 89 |

TABLE 2-2-2

| | Composite electrolyte membrane | | | | | | |
|---|---|---|---|---|---|---|---|
| | IEC (meq/g) | Filling rate in composite layer (%) | Surfactant/polymer electrolyte (mass ratio) (measured value) | Mode of phase-separated structure | Dimensional change rate $\lambda_{xy}$ (%) | Proton conductivity (mS/cm) | Dry-wet cycle durability (times) |
| Comparative Example 2-1 | — | — | — | — | — | — | — |
| Comparative Example 2-2 | — | — | — | — | — | — | — |
| Comparative Example 2-3 | 1.87 | 87 | 0 | Co-continuous | 9 | 2.8 | 12000 |
| Comparative Example 2-4 | 1.87 | 87 | 0.02 | Sea-island | 11 | 2.8 | 6000 |
| Comparative Example 2-5 | 1.22 | 71 | — | Lamellar | 11 | 0.4 | 17000 |
| Comparative Example 2-6 | — | — | — | — | — | — | — |
| Comparative Example 2-7 | — | — | — | — | — | — | — |
| Comparative Example 2-8 | 0.85 | 80 | — | None | 7 | 1.9 | 27000 |

TABLE 3-1

| | Impregnating solution Electrolyte | Surfactant Type | Treatment liquid concentration (%) | Porous substrate Material | Fluorine atom content (%) | Oxygen atom content (%) | Porosity (%) |
|---|---|---|---|---|---|---|---|
| Example 3-1 | A | Ftergent FTX-218 | 1 | ePTFE | 75 | 1.6 | 88 |
| Example 3-2 | A | Ftergent 710FS | 2 | ePTFE | 74 | 6.8 | 87 |
| Comparative Example 3-1 | A | Triton X-100 | 2 | ePTFE | 73 | 6.2 | 87 |
| Comparative Example 3-2 | A | PFOS | 2 | ePTFE | 74 | 3.6 | 87 |
| Comparative Example 3-3 | A | Fluoropolymer | 2 | ePTFE | 75 | 3.6 | 87 |
| Comparative Example 3-4 | A | —(Hydrophilic treatment) | | ePTFE | 75 | 17.5 | 88 |

TABLE 3-2

| | Composite electrolyte membrane | | | | | | |
|---|---|---|---|---|---|---|---|
| | IEC (meq/g) | Filling rate in composite layer (%) | Surfactant/ polymer electrolyte (mass ratio) (measured value) | Mode of phase-separated structure | Dimensional change rate $\lambda_{xy}$ (%) | Proton conductivity (mS/cm) | Dry-wet cycle durability (times) |
| Example 3-1 | 1.84 | 85 | 0.022 | Co-continuous | 4 | 2.9 | >30000 |
| Example 3-2 | 1.84 | 84 | 0.045 | Co-continuous | 4 | 2.8 | >30000 |
| Comparative Emample 3-1 | — | — | — | Co-continuous | — | — | — |
| Comparative Example 3-2 | 1.83 | 85 | 0 | Co-continuous | 10 | 2.8 | 11000 |
| Comparative Example 3-3 | 1.83 | 85 | 0.045 | Sea-island | 11 | 2.8 | 4000 |
| Comparative Example 3-4 | 1.53 | 72 | — | Co-continuous | 4 | 1.9 | 22000 |

The invention claimed is:

1. An electrolyte membrane comprising a polymer electrolyte and a nonionic fluorosurfactant, wherein the polymer electrolyte is an ionic group-containing aromatic hydrocarbon polymer having an aromatic ring in the main chain of the polymer, the aromatic hydrocarbon polymer being selected from a polysulfone, a polyether sulfone, a polyphenylene oxide, a polyarylene ether polymer, a polyphenylene sulfide, a polyphenylene sulfide sulfone, a polyparaphenylene, a polyarylene polymer, a polyarylene ketone, a polyether ketone, a polyarylene phosphine oxide, a polyether phosphine oxide, a polybenzoxazole, a polybenzothiazole, a polybenzimidazole, a polyamide, a polyimide, a polyetherimide, and a polyimidesulfone, wherein the ionic group has a proton exchange ability and is attached directly or indirectly to the aromatic ring of the aromatic hydrocarbon polymer, and wherein the nonionic fluorosurfactant is a compound having a fluorine-containing group including a fluorinated alkyl group, a fluorinated alkenyl group, or a fluorinated aryl group, and a nonionic lyophilic group.

2. An electrolyte membrane comprising a polymer electrolyte and a nonionic fluorosurfactant, wherein the electrolyte membrane comprises a composite layer that is a composite of the polymer electrolyte and a fluorine-containing polymer porous substrate, wherein the polymer electrolyte is an ionic group-containing aromatic hydrocarbon polymer having an aromatic ring in the main chain of the polymer, the aromatic hydrocarbon polymer being selected from a polysulfone, a polyether sulfone, a polyphenylene oxide, a polyarylene ether polymer, a polyphenylene sulfide, a polyphenylene sulfide sulfone, a polyparaphenylene, a polyarylene polymer, a polyarylene ketone, a polyether ketone, a polyarylene phosphine oxide, a polyether phosphine oxide, a polybenzoxazole, a polybenzothiazole, a polybenzimidazole, a polyamide, a polyimide, a polyetherimide, and a polyimidesulfone, wherein the ionic group has a proton exchange ability and is attached directly or indirectly to the aromatic ring of the aromatic hydrocarbon polymer, and wherein the nonionic fluorosurfactant is a compound having a fluorine-containing group including a fluorinated alkyl group, a fluorinated alkenyl group, or a fluorinated aryl group, and a nonionic lyophilic group.

3. The electrolyte membrane according to claim 2, wherein the fluorine-containing group is a perfluoroalkyl group, a perfluoroalkenyl group or a perfluoroaryl group.

4. The electrolyte membrane according to claim 2, wherein the nonionic lyophilic group is a hydrophilic group including a polyether group, a carboxylic acid ester group, a sulfonic acid ester group, a phosphorus acid ester group or a phosphoric acid ester group.

5. The electrolyte membrane according to claim 4, wherein the hydrophilic group has a polyalkyl ether structure represented by a general formula (C1) or a polyacrylate structure represented by a general formula (C2):

[Chemical Formula 1]

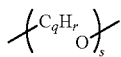 (C1)

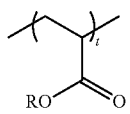 (C2)

wherein for the general formula (C1), q and r are natural numbers that satisfy r=2q, and s is an integer of 1 or more and 1,000 or less and represents a repeating number of alkyl ether structures;

wherein for the general formula (C2), R is at least one group selected from an alkyl group having 1 to 20 carbon atoms, an alkenyl group having 1 to 20 carbon atoms, and an aryl group having 6 to 20 carbon atoms, and t is an integer of 1 or more and 1,000 or less and represents a repeating number of acrylate structures; and wherein for the general formula (C1) or (C2), when s or t is 2 or more, the plurality of alkyl ether structures or acrylate structures may be identical or different.

6. The electrolyte membrane according to claim 2, wherein the nonionic fluorosurfactant has a vapor pressure at 150° C. of less than 2 kPa.

7. The electrolyte membrane according to claim 2, wherein the nonionic fluorosurfactant has a 5% weight loss temperature of 150° C. or more in thermogravimetry-differential thermal analysis.

8. The electrolyte membrane according to claim 2, wherein the nonionic fluorosurfactant has a weight average molecular weight of 1,000 or more and 10,000 or less.

9. The electrolyte membrane according to claim 2, having a content of the nonionic fluorosurfactant, in terms of mass ratio to a total amount of the polymer electrolyte, of 0.005 or more and 0.20 or less.

10. The electrolyte membrane according to claim 2, wherein the fluorine-containing polymer porous substrate contains 50 mass % or more of fluorine atoms.

11. The electrolyte membrane according to claim 2, wherein the fluorine-containing polymer porous substrate has an oxygen atom content measured by X-ray photoelectron spectroscopy of 10 mass % or less.

12. A catalyst coated membrane comprising the electrolyte membrane according to claim 2, and a catalyst layer on either side of the electrolyte membrane.

13. The catalyst coated membrane according to claim 12, wherein the catalyst layer contains a fluoropolymer electrolyte.

14. A membrane electrode assembly comprising the electrolyte membrane according to claim 2.

15. A polymer electrolyte fuel cell comprising the electrolyte membrane according to claim 2.

* * * * *